(12) United States Patent
Fernandez-Orellana et al.

(10) Patent No.: US 11,195,354 B2
(45) Date of Patent: Dec. 7, 2021

(54) GESTURE ACCESS CONTROL SYSTEM INCLUDING A MOBILE DEVICE DISPOSED IN A CONTAINMENT CARRIED BY A USER

(71) Applicant: CARRIER CORPORATION, Palm Beach Gardens, FL (US)

(72) Inventors: Pedro Fernandez-Orellana, Shanghai (CN); Ankit Tiwari, South Windsor, CT (US); Kunal Srivastava, Manchester, CT (US); Paul C. O'Neill, New Britain, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/046,189

(22) PCT Filed: Apr. 25, 2019

(86) PCT No.: PCT/US2019/029059
§ 371 (c)(1),
(2) Date: Oct. 8, 2020

(87) PCT Pub. No.: WO2019/210028
PCT Pub. Date: Oct. 31, 2019

(65) Prior Publication Data
US 2021/0043017 A1    Feb. 11, 2021

(30) Foreign Application Priority Data
Apr. 27, 2018 (CN) .......................... 201810396976.3

(51) Int. Cl.
*G07C 9/00* (2020.01)
*G06F 3/01* (2006.01)
*G06F 3/0346* (2013.01)

(52) U.S. Cl.
CPC ......... *G07C 9/00182* (2013.01); *G06F 3/017* (2013.01); *G06F 3/0346* (2013.01)

(58) Field of Classification Search
CPC .... G07C 9/00182; G06F 3/017; G06F 3/0346
See application file for complete search history.

(56) References Cited

U.S. PATENT DOCUMENTS

| 8,228,292 B1 | 7/2012 | Ruiz et al. |
| 8,339,363 B2 | 12/2012 | Krum et al. |

(Continued)

FOREIGN PATENT DOCUMENTS

| WO | 2011057287 A1 | 5/2011 |
| WO | 2011157538 A1 | 12/2011 |

(Continued)

OTHER PUBLICATIONS

International Search Report for International Application No. PCT/US2019/029059; Date of Completion: Jul. 23, 2019; dated Aug. 1, 2019; 4 Pages.

(Continued)

*Primary Examiner* — Joseph H Feild
*Assistant Examiner* — Rufus C Point
(74) *Attorney, Agent, or Firm* — Cantor Colburn LLP

(57) ABSTRACT

A gesture access system adapted to operate in conjunction with a containment carried by a user. The access system includes an access assembly, a mobile device, a storage medium, and a processor. The assembly is adapted to operate between an access and no-access states, and includes a controller, and a signal receiver. The device is disposed in the containment and includes an inertial measurement unit sensor system configured to measure a device motion of the device to conditionally detect an intentional body gesture of the user indicative of an intent to gain access. The intentional body gesture is contrary to routine containment motions (Continued)

caused by routine body motions of the user. The storage medium and the processor are configured to store and execute an application and preprogrammed motion scenario data to analyze the device motion and conditionally send a command signal to the assembly.

4 Claims, 14 Drawing Sheets

(56) References Cited

U.S. PATENT DOCUMENTS

| | | | |
|---|---|---|---|
| 8,433,537 B2 | 4/2013 | Beute | |
| 8,692,764 B2 | 4/2014 | Marvit et al. | |
| 8,811,673 B1* | 8/2014 | Fleites | H04N 21/44008 |
| | | | 382/103 |
| 8,915,784 B2 | 12/2014 | Yamanaka et al. | |
| 9,197,636 B2* | 11/2015 | Varshavsky | G06F 21/44 |
| 9,245,100 B2 | 1/2016 | Marco et al. | |
| 9,589,402 B2 | 3/2017 | Raina et al. | |
| 9,640,004 B2 | 5/2017 | Lowder | |
| 9,680,840 B2 | 6/2017 | Choi et al. | |
| 9,713,002 B2 | 7/2017 | Roy et al. | |
| 9,721,411 B2 | 8/2017 | Kauffmann et al. | |
| 9,767,630 B1* | 9/2017 | Kazerani | G07C 9/28 |
| 9,769,165 B2* | 9/2017 | Varshavsky | H04L 63/0861 |
| 9,778,749 B2 | 10/2017 | Poupyrev | |
| 9,781,106 B1 | 10/2017 | Vitus et al. | |
| 9,832,206 B2 | 11/2017 | Mare et al. | |
| 9,852,559 B2 | 12/2017 | Rettig et al. | |
| 10,181,230 B2* | 1/2019 | Esposito | H04W 4/027 |
| 10,235,820 B2* | 3/2019 | Bartels | H04W 12/065 |
| 10,257,708 B1* | 4/2019 | Kamkar | G07C 9/00571 |
| 10,769,877 B2* | 9/2020 | Kaye | H04W 64/00 |
| 10,921,900 B1* | 2/2021 | Linden | G07C 9/00563 |
| 2007/0225935 A1* | 9/2007 | Ronkainen | G06F 3/017 |
| | | | 702/150 |
| 2007/0296696 A1* | 12/2007 | Nurmi | H04W 4/029 |
| | | | 345/158 |
| 2008/0136678 A1 | 6/2008 | Harrington | |
| 2010/0317332 A1* | 12/2010 | Bathiche | H04B 1/202 |
| | | | 455/418 |
| 2012/0009896 A1* | 1/2012 | Bandyopadhyay | G06F 1/1686 |
| | | | 455/411 |
| 2012/0087482 A1 | 4/2012 | Alexander, Sr. | |
| 2012/0162057 A1 | 6/2012 | Tan et al. | |
| 2012/0190301 A1 | 7/2012 | Hart | |
| 2012/0295661 A1* | 11/2012 | Kim | G06F 3/017 |
| | | | 455/556.1 |
| 2013/0033418 A1* | 2/2013 | Bevilacqua | G06F 3/0346 |
| | | | 345/156 |
| 2013/0127591 A1 | 5/2013 | Shay et al. | |
| 2013/0159939 A1 | 6/2013 | Krishnamurthi | |
| 2013/0204707 A1* | 8/2013 | Ptucha | G06Q 30/0271 |
| | | | 705/14.66 |
| 2014/0089243 A1* | 3/2014 | Oppenheimer | G06F 21/88 |
| | | | 706/46 |
| 2014/0157209 A1* | 6/2014 | Dalal | G06K 9/00355 |
| | | | 715/863 |
| 2014/0282877 A1* | 9/2014 | Mahaffey | H04W 12/08 |
| | | | 726/3 |
| 2014/0306814 A1* | 10/2014 | Ricci | G01C 21/3667 |
| | | | 340/425.5 |
| 2014/0354527 A1* | 12/2014 | Chen | H04M 1/72454 |
| | | | 345/156 |
| 2015/0062086 A1* | 3/2015 | Nattukallingal | G06F 3/016 |
| | | | 345/175 |
| 2015/0138075 A1* | 5/2015 | Nakasu | G06F 3/011 |
| | | | 345/156 |
| 2015/0215443 A1* | 7/2015 | Heo | H04M 1/05 |
| | | | 455/556.1 |
| 2015/0288687 A1 | 10/2015 | Heshmati et al. | |
| 2016/0050308 A1 | 2/2016 | Liu et al. | |
| 2016/0196574 A1* | 7/2016 | Ganesh | G06Q 30/0246 |
| | | | 705/14.45 |
| 2016/0299570 A1* | 10/2016 | Davydov | G06F 3/167 |
| 2017/0080332 A1* | 3/2017 | Poisner | A63F 13/211 |
| 2017/0131395 A1 | 5/2017 | Reynolds et al. | |
| 2017/0372549 A1 | 12/2017 | Einberg | |
| 2018/0046851 A1* | 2/2018 | Kienzle | G06F 3/013 |
| 2018/0096546 A1* | 4/2018 | Bartels | G07C 9/00309 |
| 2018/0253917 A1* | 9/2018 | Kazerani | G07C 9/28 |
| 2018/0290627 A1* | 10/2018 | Hariri | B60R 25/245 |
| 2019/0236869 A1* | 8/2019 | Kazerani | H04W 4/80 |
| 2019/0272690 A1* | 9/2019 | Kaye | G07C 9/00571 |
| 2019/0354193 A1* | 11/2019 | Sawada | G06F 3/0416 |
| 2020/0168017 A1* | 5/2020 | Prostko | G07C 9/00563 |
| 2020/0349786 A1* | 11/2020 | Ho | G06K 9/00288 |
| 2021/0035396 A1* | 2/2021 | Tiwari | G06F 3/0346 |
| 2021/0035397 A1* | 2/2021 | Srivastava | G07C 9/257 |
| 2021/0035398 A1* | 2/2021 | Tiwari | G07C 9/29 |
| 2021/0064141 A1* | 3/2021 | Nemeth | H04M 1/72424 |
| 2021/0072834 A1* | 3/2021 | Fernandez-Orellana | |
| | | | G06F 3/017 |
| 2021/0081650 A1* | 3/2021 | Kienzle | B60K 35/00 |

FOREIGN PATENT DOCUMENTS

| | | |
|---|---|---|
| WO | 2016087541 A1 | 6/2016 |
| WO | 2016175219 A1 | 11/2016 |

OTHER PUBLICATIONS

Manon Kok, Jeroen D. Hol and Thomas B. Schon (2017), "Using Inertial Sensors for Position and Orientation Estimation", Foundations and Trends in Signal Processing: vol. 11: No. 1-2, pp. 1-89. http://dx.doi.org/10.1561/2000000094.

Written Opinion for International Application No. PCT/US2019/029059; International dated Apr. 25, 2019; Priority Date: Apr. 27, 2018; 9 Pages.

Coxworth, B. "Mobile Technology: SideSwipe lets phones read hand gestures using reflected wireless signals", Publication Date: Sep. 22, 2014; Retrieved from: https://newatlas.com/sideswipe-gesture-recognition-reflected-wireless-signals/33923/; 6 Pages.

International Search Report for International Application No. PCT/US2019/029035; Date of Completion: Jul. 23, 2019; dated Aug. 1, 2019; 5 Pages.

Ma, M. "Reflected smartphone transmissions enable gesture control", UW News, Publication Date: Sep. 19, 2014; Retrieved from https://www.washington.edu/news/2020/06/23/75-of-us-workers-cant-work-exclusively-from-home-face-greater-risks-during-pandemic/2020/; 5 Pages.

Scott et al. "Sensing Foot Gestures from the Pocket" UIST '10: Proceedings of the 23nd Annual ACM Symposium on User Interface Software and Technology; Oct. 2010; Retrieved from: https://doi.org/10.1145/1866029.1866063; pp. 199-208.

Written Opinion for International Application No. PCT/US2019/029035; International dated Apr. 25, 2019; Priority Date: Apr. 27, 2018; 11 Pages.

* cited by examiner

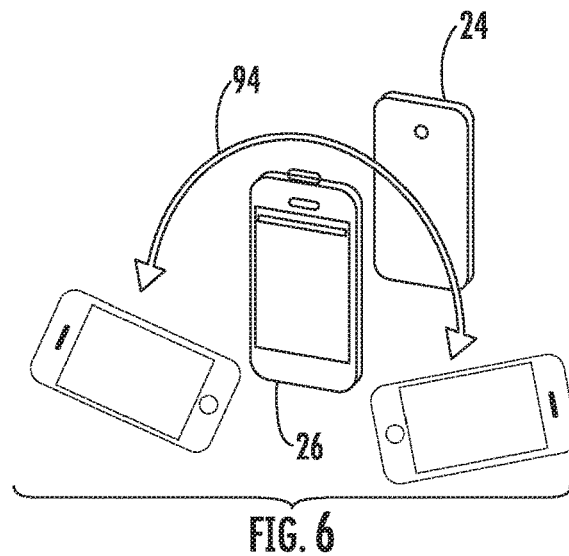
FIG. 6
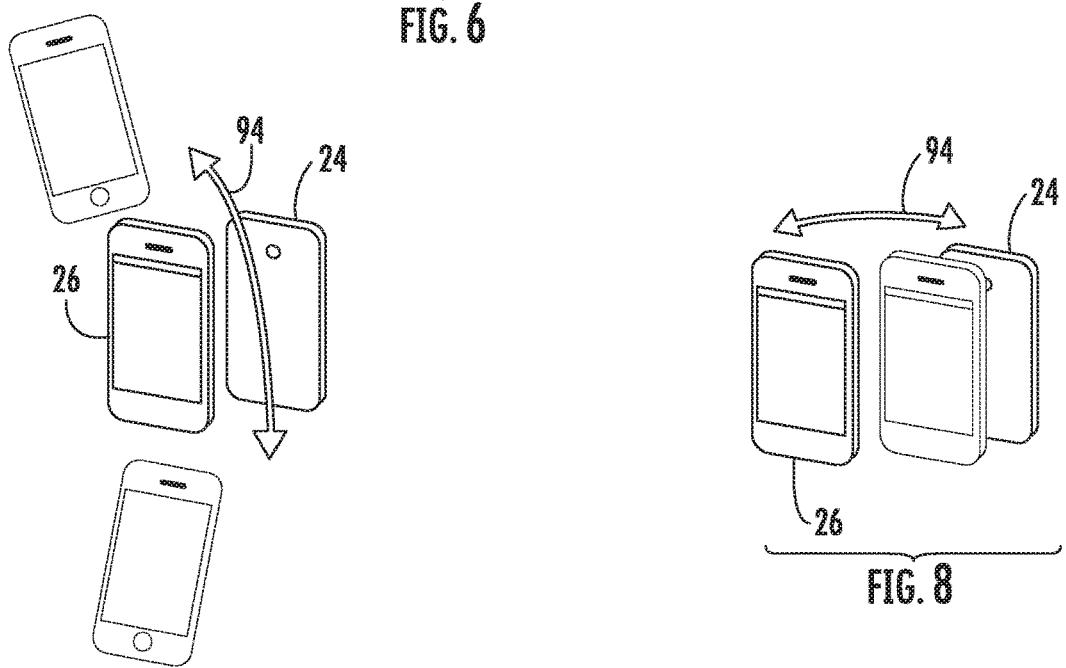
FIG. 7
FIG. 8
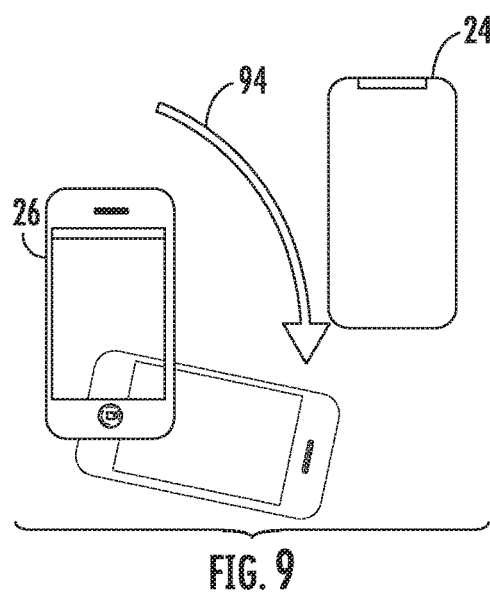
FIG. 9

(12) United States Patent
US 11,195,354 B2

GESTURE ACCESS CONTROL SYSTEM INCLUDING A MOBILE DEVICE DISPOSED IN A CONTAINMENT CARRIED BY A USER

CROSS-REFERENCE TO RELATED APPLICATIONS

This application is a Non-Provisional Application of PCT/US2019/029059 filed Apr. 25, 2019, which claims the benefit of Chinese Application No. 201810396976.3 filed Apr. 27, 2018, the disclosure of which is incorporated herein by reference in its entirety.

BACKGROUND

The present disclosure relates to access control systems, and more particularly, to gesture access control system including a mobile device disposed in a containment carried by a user.

Access control systems are used in a variety of applications including structures, buildings and or components including safes, subway turnstiles, child proof storage containers, and many other applications. In the, non-limiting, example of buildings, many such structures must be secured in the sense that the identification and number of people entering and exiting a building at any given moment in time should be known. One known way in achieving this task is to assign a badge to all individuals requiring access. Each human is then required to perform a hard badge-in task at a reader located proximate to any entry point. In one example, the badge may be identified by the reader via a magnetic strip. Another example is reading a badge using RFID. Unfortunately, such a process requires each human to, for example, swipe their badge separately before entry is allowed. This task can be time consuming.

More current access control systems utilize smartphones in place of badges. A key technology behind such use of smartphones is Near Field Communications (NFC) which allows short range communication. With this application, both the smartphone and the local access control reader must have NFC hardware. Other options may include a Human Interface Device (HID) of a reader capable of detecting, for example, a twisting of a smartphone in front of the reader in a controlled fashion to show intent. However, both the smartphone and the reader must be capable of independently detecting the intent. Moreover, current methods still require the user to retrieve the smartphone and perform specific acts with the smartphone. Such retrieval and/or action can be frustrating for the user and time consuming.

Improvements in access systems that may further optimize ease of operation with, or without, reduced components is desirable.

BRIEF DESCRIPTION

A gesture access system adapted to operate in conjunction with a containment carried by a user, the gesture access system comprising: a local access assembly adapted to operate between an access state and a no-access state, the local access assembly including a controller to effect actuation between the access state and the no-access state and a signal receiver; a mobile device disposed in the containment and including an inertial measurement unit (IMU) sensor system configured to measure a mobile device motion of the mobile device to conditionally detect an intentional body gesture of the user indicative of an intent of the user of the mobile device to gain access, wherein the intentional body gesture is contrary to routine containment motions caused by routine body motions of the user; one or more electronic storage mediums configured to store an application and preprogrammed motion scenario data modeled in association with the intentional body gesture; and one or more processors configured to receive the mobile device motion from the IMU sensor system, and execute the application to compare the mobile device motion to the preprogrammed motion scenario data, and thereby conditionally output a command signal to the controller of the local access assembly via the receiver to effect actuation from the no-access state to the access state.

Additionally to the foregoing embodiment, the mobile device motion is a compound motion indicative of the routine body motion and the intentional body gesture.

Additionally to the foregoing embodiment, the mobile device motion is indicative of a parameter factor associated with a location of the mobile device and a type of the containment.

In the alternative or additionally thereto, in the foregoing embodiment, the mobile device includes an environment detection system configured to send information to the application for determining a location of the mobile device.

In the alternative or additionally thereto, in the foregoing embodiment, the containment is a handbag grasped by a hand of the user, the routine containment motion includes swinging forward and rearward, and the intentional body gesture is a horizontal twisting motion of the hand.

In the alternative or additionally thereto, in the foregoing embodiment, the containment is a handbag grasped by a hand of the user, the routine containment motion includes swinging forward and rearward, and the intentional body gesture is a repeating vertical motion of the hand resulting in a vertical shaking of the handbag.

Additionally to the foregoing embodiment, the containment is a backpack secured to a back of the user, the routine containment motion includes a forward motion indicative of walking in a forward direction, and the intentional body gesture is a twisting motion of a torso of the user.

A method of operating the gesture access system comprising: placing a mobile device in a containment; carrying the containment with a part of a body of a user; performing an intentional body gesture using the part of the body with the intent to gain access; measuring a mobile device motion indicative of at least a containment gesture caused by the intentional body gesture by an IMU sensor system of the mobile device; comparing the mobile device motion by a processor to preprogrammed motion scenario data to determine if the intentional body gesture was performed by the user; sending a command signal to an access assembly by the mobile device if the intentional body gesture was performed.

In the alternative or additionally thereto, in the foregoing embodiment, the containment is a handbag and the part of the body is a hand.

In the alternative or additionally thereto, in the foregoing embodiment, the intentional body gesture is a twisting of the hand.

In the alternative or additionally thereto, in the foregoing embodiment, the intentional body gesture is a repetitious upward and downward motion of the hand.

Additionally to the foregoing embodiment, the containment is a backpack and the part of the body is a torso.

Additionally to the foregoing embodiment, the intentional body gesture is a twisting of the torso.

In the alternative or additionally thereto, in the foregoing embodiment, the intentional body gesture is a flexing left-to-right of the torso.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 6 is a schematic of first example of a device gesture;

FIG. 7 is a schematic of a second example of a device gesture;

FIG. 8 is a schematic of a third example of a device gesture;

FIG. 9 is a schematic of a fourth example of a device gesture;

DETAILED DESCRIPTION

Figure 1:
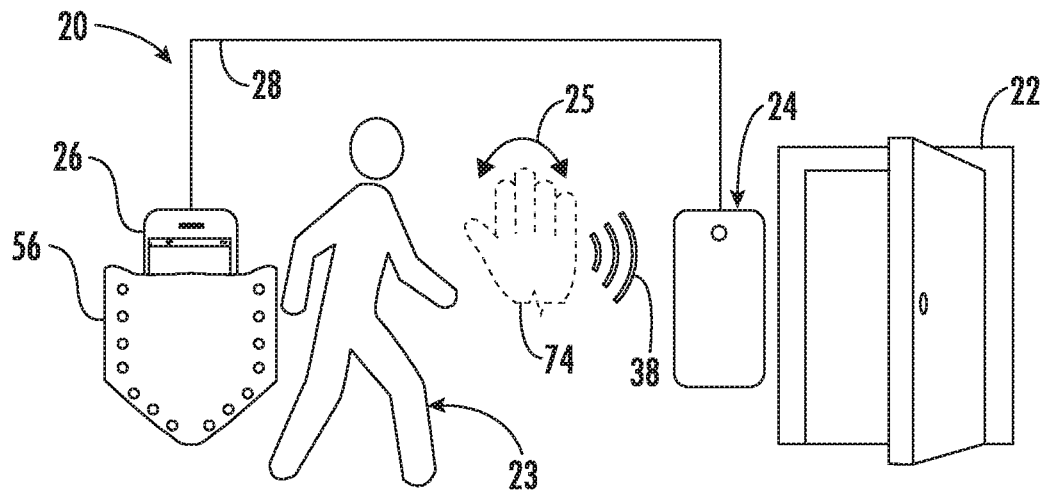
FIG. 1 is a schematic of an access control system utilizing a device-free gesture and applied to a door.

Referring to FIG. 1, a gesture-based access control system 20 is illustrated in one, non-limiting application, of a door 22 providing user access into, and out of, a building, structure, room, or the like. In this embodiment, the access control system 20 is adapted to unlock the door upon a detected, intentional, gesture made by a user 23 (e.g., human) desiring access. Although the present application is applied to the door 22, it is contemplated and understood that the access control system 20 may also apply to anything requiring access control including, for example, computers, subway turnstiles, safes, child proof storage compartments, and others. As will become more apparent, the intentional gesture may be a device-free gesture (see arrow 25 in FIG. 1) in some embodiments, or a device gesture (see arrow 94 in FIG. 6) in other embodiments.

Figure 2:
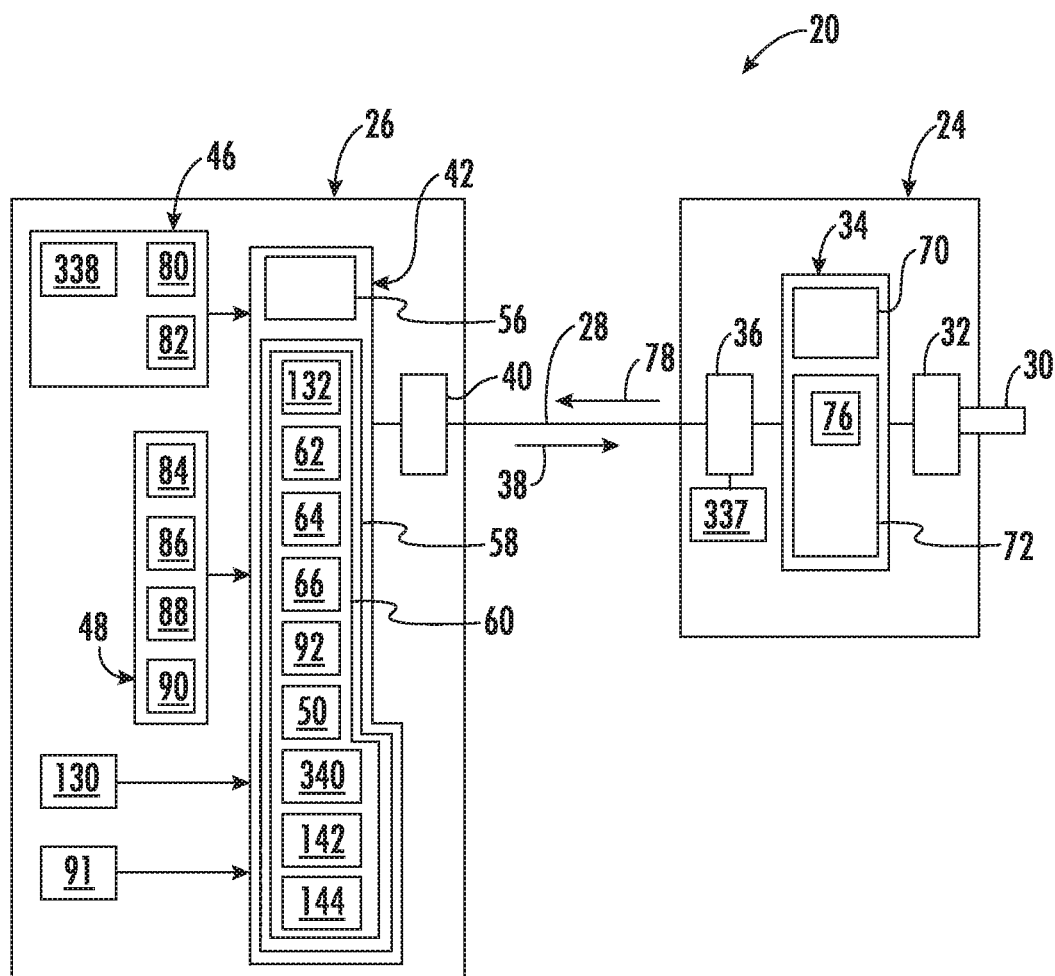
FIG. 2 is another schematic of the access control system.

Referring to FIGS. 1 and 2, and in one embodiment, the access control system 20 includes a lock, or access, assembly 24, a mobile device 26 carried by the user 23, and a wireless interface 28. The mobile device 26 is adapted to wirelessly communicate with the lock assembly 24 over the wireless interface 28. The lock assembly 24 may include a latch 30 (e.g., deadbolt), a driver 32, a controller 34, and a receiver 36 that may be a transceiver with bi-directional communication capability, and that includes an antenna. The receiver 36 is configured to receive a wireless access, or command, signal (see arrow 38) over the wireless interface 28 and from the mobile device 26. The access signal 38 is sent to the controller 34. The controller 34 may process the signal 38, and based on the signal, initiate the driver 32 to move the latch 30 from a no-access state to an access state (i.e., locked and unlocked positions). In one embodiment, the access assembly 24 is an access reader (e.g., RFID reader). Examples of the signal 38 may be Bluetooth, Wifi, or other communication signals that may be short range. The access assembly 24 may be a local access assembly 24, and is generally located proximate to the door, or other component, whose access the assembly 24 is adapted to control.

The controller 34 may be any combination of one or more of a central processing unit (CPU), multiprocessor, microcontroller unit (MCU), digital signal process (DSP), application specific integrated circuit, and others capable of executing software instructions, or otherwise controllable to behave according to predetermined logic. In one example, the driver 32 is an electric motor with a relay operated by the controller. In another example, the driver 32 is an electromagnetic driver. The wireless interface 28 is any current or future wireless interface allowing communication between the mobile device 26 and the lock assembly 24. Non-limiting examples of the wireless interface 28 include Bluetooth, Bluetooth Low Energy (BLE), Radio Frequency Identification (RFID), Near Field Communication (NFC), any of the IEEE 802.11 standards, and others.

In one embodiment, the mobile device 26 includes a transmitter 40 that may be a transceiver having an antenna, a controller 42, and at least one detection system (i.e., three illustrated as 46, 48, 50). The at least one detection system may include an inertial measurement unit (IMU) sensor system 46, an environment detection system 48, an internal activity (i.e., usage) notification module 50, and others for generally determining motion, position, location, and usage of the mobile device 26 relative to the user 23. Non-limiting examples of the mobile device 26 include a smartphone, a mobile phone, a key fob, a wristwatch (i.e., smart watch), and other similar devices typically carried by the user 23.

The controller 42 of the mobile device 26 includes a processor 56 and a storage medium 58. Optionally, the processor 56 is any combination of one or more of a central processing unit (CPU), multiprocessor, microcontroller unit (MCU), digital signal processor (DSP), application specific integrated circuit, and others capable of executing software instructions or otherwise controllable to behave according to predetermined logic. The storage medium 58 is, optionally, any combination of read and write memory (RAM) and read only memory (ROM). The storage medium 58 may also include persistent storage, which can be any single one or combination of solid state memory, magnetic memory, or optical memory storing a computer program (i.e., application) with software instructions.

In one embodiment, and similar to the controller 42 of the mobile device 26, the controller 34 of the lock assembly 24 may include a processor 70 and a storage medium 72. Optionally, the processor 70 is any combination of one or more of a central processing unit (CPU), multiprocessor, microcontroller unit (MCU), digital signal processor (DSP), application specific integrated circuit, and others capable of executing software instructions or otherwise controllable to behave according to predetermined logic. The storage medium 72 is, optionally, any combination of read and write memory (RAM) and read only memory (ROM). The storage medium 72 may also include persistent storage, which can be any single one or combination of solid state memory, magnetic memory, or optical memory storing a computer program (i.e., application) with software instructions. It is contemplated and understood that in one embodiment, the controller 42 may not include a storage medium 72, and may only include control circuitry capable of receiving the signal 38 from the mobile device 26 as a command signal that initiates actuation of the lock assembly 24.

The gesture-based access control system 20 may further include an application 60. In one embodiment, the application 60 is software-based and is stored, at least in-part, in the storage medium 58 for retrieval and execution by the processor 56 of the controller 42. The application 60 may include computer instructions 62, and a database of preprogrammed data. For example, the preprogrammed data includes credential data 64, and scenario data 66. In one embodiment, the scenario data 66 is indicative of a 'compound' motion by the user 23 that may not necessarily include the gesture, but is dependent upon (i.e., a function of) the carrying location of the mobile device 26 on the user 23.

In another embodiment, the application 60 may at least in-part be stored in at least one storage medium contained in a cloud (i.e., remote server) and executed at least in-part by at least one processor of the cloud.

For reasons of clarity, the term "intentional gesture" as used herein is an act (e.g., physical motion) performed by the user 23 to gain access. In one example, the access gained may be through a door 22 (see FIG. 1), but may also be access into any physical structure and/or electronic systems (e.g., computer). For purposed of this disclosure, examples of an intentional gesture may include a device-free gesture, a device gesture, and an inherent gesture.

The term "device-free gesture," refers to an intentional gesture that generally does not physically include the mobile device 26 (see gesture 25 in FIG. 1). For example, if the device-free 25 made by the user 23 is the waving of a right hand 74, the mobile device 26 is not in the right hand 74 but may be located anywhere else on the person of the user 23. In contrast, the term "device gesture," (see gesture 94 in FIG. 6) means the mobile device 23, itself, is being used as part of the intentional gesture. In the present example, the device gesture 94 would include the waving of the mobile device 26. More specifically and in line with the present example, the mobile device 26 would be in the right hand 74 being waved (see FIGS. 5 and 6). Lastly, the term "inherent gesture" (see gesture 341 in FIG. 18) is the gesture applied as part of a seamless access control system. That is, the typical act of, for example, opening a door (or typical motion(s) made toward the preparation of opening the door) is the gesture. The inherent gesture is "intentional" in the sense that the user 23 intends to gain access. Specific examples of the inherent gesture may be reaching for a door handle, or pulling upon a door handle.

Determination of Mobile Device Motion, Position, and Location Relative to User:

Determination of motion (i.e., the compound motion) of the mobile device 26 is needed to recognize an intentional gesture made by the user 23 through differentiation of one or more motions made by the user simultaneously. The determination of the position and/or location of the mobile device 26 relative to the user 23 may assist in the differentiation of multiple motions made by the user 23 from the measured compound motion of the mobile device 26. Alternatively, or in addition to, determining the location of a mobile device 26 with respect to the user 23 may be advantageous when two access assemblies 24 if respective doors 22 are positioned closely together. In this scenario, knowing the location of the mobile device 26 would prevent, or reduce the chances, of the user 23, via the device-free intentional gesture, gaining access through the wrong door.

The inertial measurement unit (IMU) sensor system 46 may include one or more of an accelerometer 80, a gyroscope 82, and others adapted to detect acceleration, and thus movement, in at least one dimension, and optionally three dimensions. The environment detection system 48 may include one or more of a visual camera 84 (i.e., computer-vision system), a temperature sensor, 86, a light sensor 88, and a proximity sensor 90 adapted to at least improve a level of confidence when differentiating the compound motion to determine if a device-free intentional gesture is being made by the user 23.

The internal activity notification module 50 may also contribute toward the optimization of confidence levels, and may be part of the application 60 or may be a separate computer software instruction. For example, the activity notification module 50 may notify the application 60 that the user 23 is texting via the mobile device 26, or is conducting a phone conversation. When differentiating the compound motion, the application 60 may then attribute part of the motion toward, for example, the texting activity. In one embodiment, and depending upon how the information data is processed by the application 60, the visual camera 84 may be part of the IMU sensor system 46 (i.e., taking multiple pictures to determine motion), and/or may be part of the internal activity notification module 50 (i.e., the user 23 is undergoing the activity of taking photographs for pleasure).

In one embodiment, the visual camera 84 is adapted to detect movement via the capturing of images of surroundings and analyzing differences in the images over time. The temperature sensor 86 is adapted to measure temperature. In one embodiment, temperature data is indicative of, at least in-part, the body temperature of the user 23. For example, if the mobile device 26 is in a rear pocket 56 (see FIG. 1) of clothing worn by the user 23, the temperature data may be associated with a temperature that is higher than if the mobile device 26 were located in a purse or backpack worn by the user 23. The proximity sensor 90 is adapted to determine how close the mobile device 26 is to the user 23. For example, the mobile device 26 may be resting on a desk, may be in a back pocket 56, may be in a purse, or may be in a backpack. The proximity sensor 90 may also be used to determine if a substantial portion of the user 23 is located between the sensor 90 and the access assembly 24, which may cause a degree of attenuation of signals between the assembly 24 and the mobile device 26.

The light sensor 88 is adapted to measure the level of light adjacent to the mobile device 26. Light data sent to the processor 42 from the light sensor 88 may be indicative of the location of the mobile device 26 at the time of gesturing by the user 23. For example, the mobile device 26 may be in the rear pocket 56 of clothing worn by the user 23.

Figure 4:
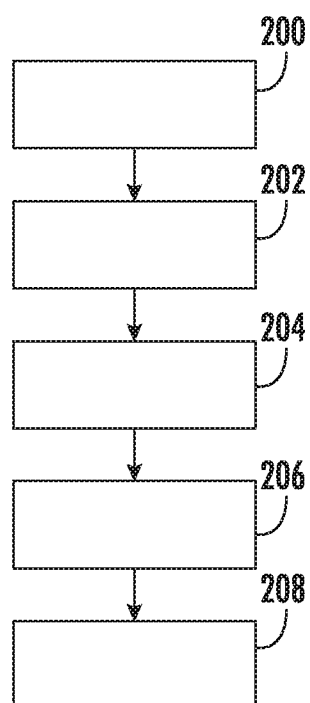
FIG. 4 is a flow chart of a method of determining motion, location and position of a mobile device of the access control system.

In operation, the IMU sensor system 46 enables the identification of gesture based intent, and the environment detection system 48, and optionally the activity notification module 50 function to boost the reliability of the intentional gesture identification. In one example, this is achieved by the fusion of information gained from the systems 46, 48, and module 50 by the application 60 and use of machine learning algorithm(s) and/or the preprogrammed scenario data 66. Referring to FIG. 4, a method of determining a location and/or position of a mobile device 26 with respect to the user 23 includes, at block 200, the motion device 26 activity being in standby, or otherwise blocked.

At block 202, the IMU sensor system 46 detects a periodic movement (i.e., the compound motion) and sends the information to the controller 42. At block 204, the application 60 determines that at least a portion of the compound motion is characteristic of walking via at least one algorithm, and at least a portion of the preprogrammed scenario data 66. At block 206, the temperature sensor 86 and/or the light sensor 88 of the environment detection system 48 sends information (i.e., confirmation parameter data) to the controller 42 that is used by the application 60, to determine that the mobile device 26 is in, for example, a back pocket or a backpack (i.e., the light sensor 88 detects a dark environment). Moreover, the IMU sensor system 46 may also assist in detecting the relative position of the mobile device 26. For example, the angle of the mobile device 26 with respect to the ground, or floor surface, may be indicative front pocket verse back pocket location, etc. At block 208, the activity notification module 50 may provide information to the application 60 indicative of the current use (e.g., texting) of the mobile device 26 by the user 23. Such current use may provide indications of the likely position of the mobile device 23 (i.e., vertical, horizontal, or positions there-between) and/or mobile device motions that are part of the compound motion which may ultimately be differentiated from the intentional gesture. To accomplish blocks 206 and 208, the application 60 may apply an algorithm and/or the preprogrammed scenario data 66.

Training of Software-Based Application:

Referring to FIG. 2 and in operation, the application 60 may include training instructions (i.e., setup or calibration instructions) communicated to the user 23 via a human interface device (HID) 91 (see FIG. 2) of the mobile device 26. The training instructions may instruct the user 23 to perform a variety of motions with the mobile device 26 carried by the user 23 in various locations (e.g., back pocket, front pocket, left hand while right hand is gesturing, and others), or ways (e.g., backpack, purse, and others), and/or while performing certain activities with the mobile device 26 (e.g., texting, conversing, and others). While the user 23 performs the various motions and/or routines, the application 60 may build, and thus preprogram, the scenario data 66 utilizing information received from the at least one of the IMU sensor system 46, the environment detection system 48, and the internal activity notification module 50.

For example, the application 60 may instruct the user 23 to walk with the mobile device 26 in the rear pocket 56. The motion and other parameters are then detected by at least one of the systems 46, 48, and the module 50, and the resulting information is preprogrammed as part of the scenario data 66. As part of another event, the application 60 may then instruct the user 23 to perform the same walk with the mobile device 26 in the same location, but while performing a chosen gesture intended to cause the access assembly 24 to respond (i.e., unlock). Again, the resulting motion detected by one or more of the systems 46, 48 and module 50 is recorded as part of the scenario data 66. Similar instructions may progress with the user 23 relocating the mobile device 26 on his or her person and performing various movements with and without the gesturing. Upon completion of the training instructions, the scenario data 66 may generally resemble a matrix or array of data.

In one embodiment, the application 60 may include machine learning techniques and/or algorithms (e.g., deep learning). With machine learning algorithms, gesture recognition can be trained more and more to a given user's particular interactions. Moreover, by conducting a form of 'continuous' training, the application 60 has the ability to conform to a user's changing habits (i.e., possibly caused by an injury) over a period of time.

In one example, the application 60 may include machine learning algorithm(s) configured to determine, or confirm, user intent from explicit intent signal(s) generated by one or more of the detection systems 46 48, 50, and determine user authentication (i.e., the mobile device 26 actually belongs to the user 23) by matching the intent signals against a user specific, pre-defined, pattern. The user intent and user authentication may be inferred from IMU signals, audio signals, RSSI (e.g., Bluetooth), and other data from, for example, from wearable mobile devices 26. In another embodiment, while user intent may be confirmed by a number or pattern of knocks, user authorization may be confirmed by the intensity of the knocks, a delay between knocks, and/or a change of intensity from one knock to the next.

Figure 23:
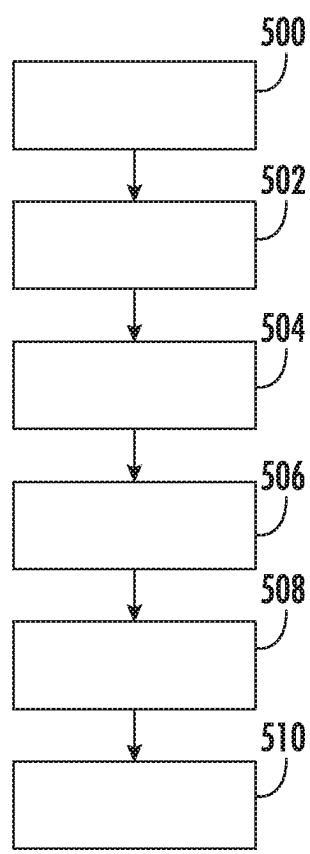
FIG. 23 is a flow chart of a method of training the gesture-based access control system.

Referring to FIG. 23 and in one embodiment, the application 60 may include a training mode of operation. At block 500, and via the HID 91, the user 23 may select the training mode. In this mode, and at block 502, the user 23 is prompted by the application 60 via the HID 91, and may select, an intentional gesture type from a library of supported gesture types as part of the scenario data 66. At block 504, the user 23 is prompted by the application 60, and the user 23 may perform, repetitions of the selected gesture type for intent. At block 506, machine learning algorithm(s) are collecting and analyzing data from the repetitious performance of the selected gesture type to build a user specific model associated with selected gesture type and as part of the scenario data 66. At block 508, the machine learning algorithm(s) determine that that the user specific model is of sufficiently high quality and confidence, and the application 60 via the HID 91, notifies the user 91 of model completion. Non-limiting examples of gesture types may include tapping by the user 23 on the mobile device 26 for a fixed number of times (i.e., a prescribed pattern, see FIG. 20), a knock on the door 22, a user specific voice command made into a microphone 130 of the mobile device 26 (see FIG. 2), and other gesture types.

After the training mode of operation, the application 60 may enter into a deployment mode. In this mode, statistical machine learning techniques are deployed, via algorithms, which may be in, and supported by, a cloud 360 (i.e., a remote server, see FIG. 19). In this example, at least a portion of the application 60 may be in the cloud 360, and the cloud functions to build the user specific model. In one embodiment, the user specific model may be improved over time via the use of machine learning algorithms. In this way, specific users 23 become easier to identify over time. At block 510, the user 23 may then perform a list of pre-trained gestures (i.e., preprogrammed into the application 60) to signal intent and authenticate them.

More specifically, in the training mode of operation, data is collected reflective of specific actions enforced upon the user 23 for purposes of training. This may be considered as defining the ground truth of the 'right way' of performing a gesture. Optionally, the application 60 may also collect data on how the specific actions is not to be performed to further enhance the learning.

Once the training mode is complete and the data is collected, algorithms are then trained with the data to extract the relevant information/features that detect if the specific action, or gesture, was performed and in the right way. The result is a trained model (i.e., the user specific model) that is then deployed.

Figure 24:
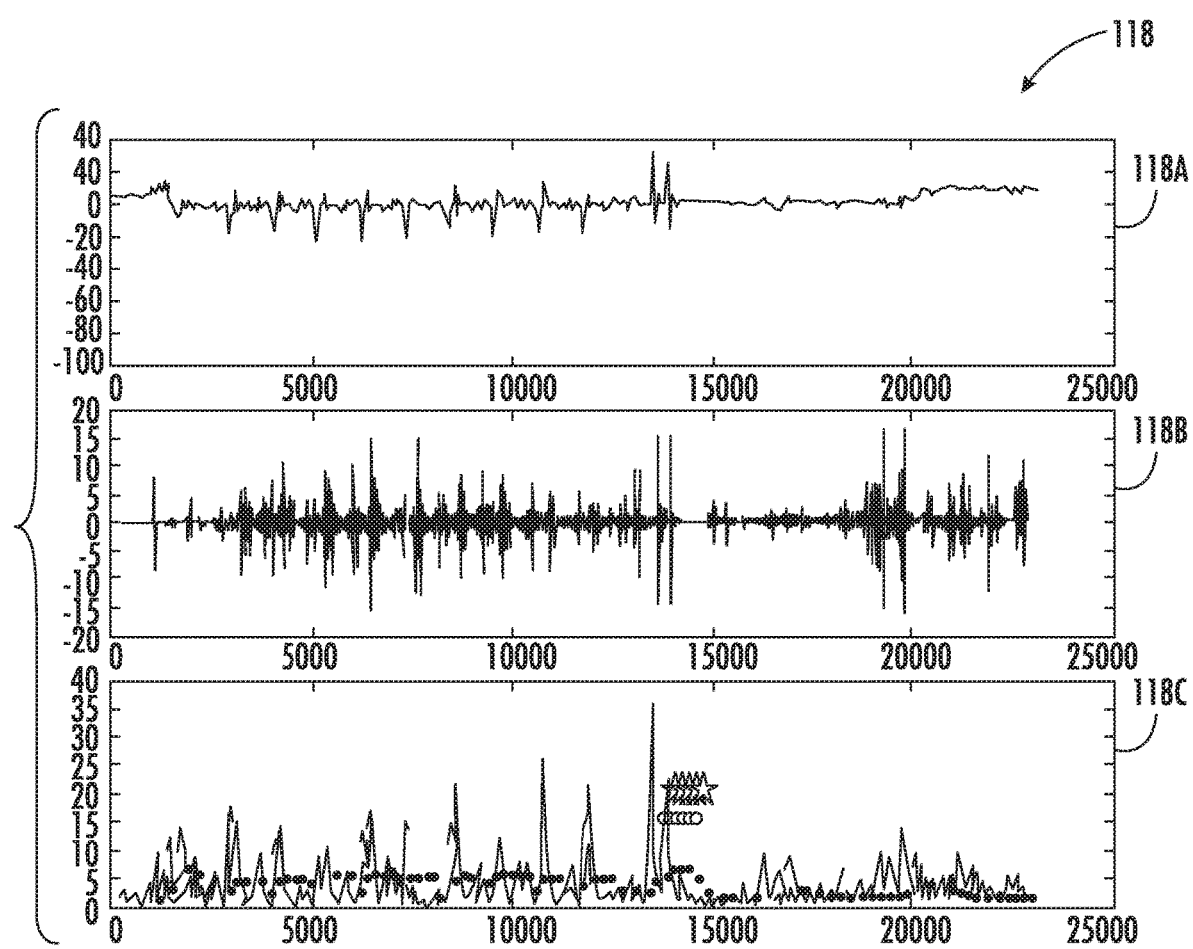
FIG. 24 is a graph illustrating a user specific model as part of preprogrammed scenario data of a software-based application of the gesture-based access control system.

Referring to FIG. 24, a graph 118 having three portions 118A, 118B, 118C is illustrated that generally reflects one example of a modeling process wherein the gesture type may be tapping on the mobile device 26. The X-axis of each graph portion 118A, 118B, 118C is over a common time duration. Graph portion 118A illustrates raw accelerometer data caused by movement of the mobile device 26 incurred during tapping. Graph portion 118B illustrates corresponding audio data. Graph portion 118B illustrates extracted features with the tapping confirmation highlighted with star symbols. The spike patterns and the time intervals between spikes are unique to the user 23 and may be used as the authentication (i.e., code).

Completion of the training and deployment modes produces the user specific detection model that serves both as gesture confirmation and a user authentication based on the observed signals from one or more of the detection systems 46, 48, 50. The model also provides a confidence level in user authentication that may improve with further usage. This confidence level may be used to allow or deny access to, for example, building areas.

Distinguishing Separate User Movements from a Measured Compound Motion by the Mobile Device:

In one embodiment, the application 60 may rely on the observation that the device-free gesture (e.g., hand waving) produces minute periodic motion of the human body (i.e., a part of the compound motion) that can be captured using the IMU sensor system 46, the environment detection system 48, and/or the internal activity notification module 50 of the mobile device 26. Machine learning algorithms are trained to distinguish the associated minute motion, indicative of the gesture, from other and more prominent body movements that may be observed during walking or conversing.

Optionally, the controller 42 of the mobile device 26 may receive data from the light system 54. In one example, the light data may be applied to determine if the mobile device 26 is carried in a hand, or alternatively, in a pocket, backpack, or purse. The temperature sensor 86 of the environment detection system 48 may output temperature data to the controller 42 to determine if, for example, the mobile device 26 is in a hand or pocket, as oppose to in a backpack or purse. The temperature and/or light data may be applied as additional data toward the compound motion to increase matching confidence levels when the application 60 compares, or attempts to match, the compound motion to the preprogrammed scenario data 66.

In one embodiment, the chosen device-free intentional gesture may be the waving of a hand 74 (see FIG. 1) that is free of the mobile device 26. That is, the mobile device 26 is located elsewhere on, or near, the user 23. In other words, the user 23 is not required to retrieve his/her mobile device 26 to perform any device function or input. The user 23 need only perform the correct intentional gesture to gain access through, for example, the door 22. Examples of other intentional gestures may include left-to-right motions of a human arm, up-to-down motions of the human hand 74, a motion of the head and/or shoulders, or any other distinctive motion.

In one embodiment, the intentional gesture may be a secret gesture, thus further authentication between the mobile device 26 and the access assembly 24 is not needed. In this example, the access assembly 24 may be relatively simple, and need not be preprogrammed.

In another embodiment, the access assembly 24 may be preprogrammed to only accept command signals 38 that are entrained, or accompanied, with an authentication code generally preprogrammed into both controllers 34, 42. Thus the controller 34 is capable of matching a received authentication code from the mobile device 26 (i.e., part of signal 38) to a code 76 preprogrammed into the storage medium 72.

Figure 3:
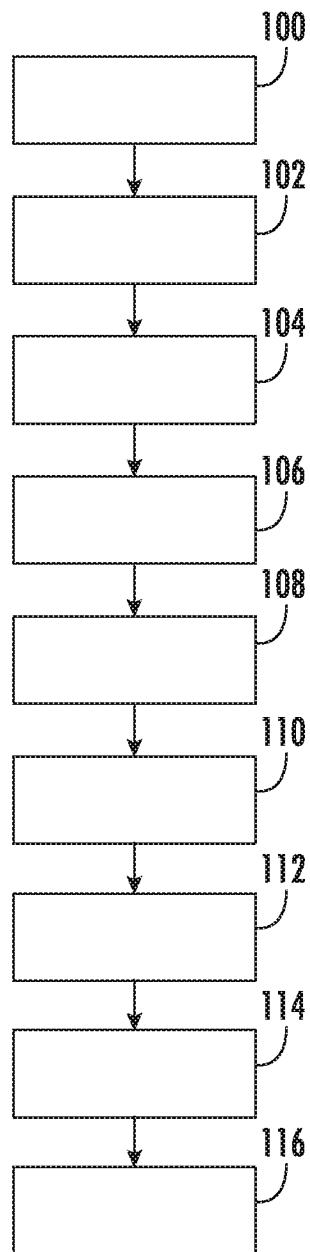
FIG. 3 is a flow chart of a method of operating the access control system.

Referring to FIGS. 2 and 3, and during normal operation of the gesture access control system 20; at block 100, the controller 34 of the access assembly 24 may broadcast a beacon signal (see arrow 78 in FIG. 2) via the transceiver 36. In one example, the beacon signal 78 may be encoded as part of the authentication process between the mobile device 26 and the access assembly 24. In one example, the broadcast beacon signals 78 may be of a Bluetooth radio type. In other examples, the signal 78 may be Wifi/cell radio or may be an audible frequency spectrum. It is further contemplated and understood that other ways of authenticating the mobile device 26 with the access assembly 24, which are known by thus skilled in the art, may be applied while the novelty of the gesturing process is maintained.

At block 102, the transceiver 40 of the mobile device 26 may receive the beacon signal 78 when generally within a prescribed range. Once received, at block 104, the mobile device 26 generally initiates the application 60. In another embodiment, the application 60 may not need to be initiated by a beacon signal. Therefore, in some applications, the access assembly 24 may not be adapted to broadcast a beacon signal.

At block 106, when within a general vicinity of the access assembly 24, and/or with the application 60 active, the application 60 may be accepting and processing compound motion data from the IMU sensor system 46 of the mobile device 26 to determine the activity of the user 23 (i.e., walking, conversing, standing still, and others), and other influencing data or information from the environment detection system 48, and/or the internal activity notification module 50 to determine influential parameters such as the mobile device location, position and/or usage. At block 108, the application 60 matches the compound motion data and influencing parameter data to the preprogrammed scenario data 66, with a predetermined level of confidence, to determine if the user 23 is performing an intentional gesture (e.g., device-free intentional gesture) indicative of an intent to access.

At block 110, and in one example, the user 23 may be walking with the mobile device 26 in a rear pocket, and while performing a device-free intentional gesture with the right hand 74. At block 112, the application 60 determines where the mobile device 26 is located on the user 23, determines that the user 23 is walking, and determines that the device-free intentional gesture is being performed by comparing the compound motion and other influencing parameter data (e.g., light, temperature, and others) to the scenario data 66. At block 114, and after recognition of the device-free intentional gesture by the controller 42 of the mobile device 26, the mobile device 26 broadcasts a command signal 38 to the access assembly 24. At block 116, the access assembly 24 actuates from a no-access state and to an access state, whereupon the door 22 may be opened by the user 23.

In one embodiment, it may be a pre-condition that the user 23 is not walking before a gesture may be recognized or accepted by the mobile device 26. In this embodiment, the accelerometer system and/or the gyroscope system of the mobile device 26 may be applied to confirm the user 23 is generally motionless except for the motion of the gesture itself.

Detecting and/or Confirming an Intentional Gesture Through RSSI:

Referring again to FIG. 2, the beacon signal 78 broadcasted by the access assembly 24 via the transceiver 36 may be received by the controller 42, via the transceiver 40, and generally as a received signal strength indicator (RSSI). More specifically and as an optional embodiment, the gesture-based access control system 20 may further include an RSSI module 92 that may be software-based and part of the application 60. In other embodiments, the RSSI module 92 may by a separate sensor system of the mobile device 26 that may include software and hardware.

In operation, the gesture-based access control system 20 may perform as described in blocks 100-116 (see FIG. 3), except with the additional feature provided by the RSSI module 92. More specifically, the beacon signal 78 received by the mobile device 26 at block 102 is also processed by the RSSI module 92 that is configured to detect periodic variations in signal strength indicative of the intentional gesture crossing through the signal 78 (i.e., near to and repetitiously crossing in front of the access assembly 24). In one example, it may be an arm of the user 23 crossing back-and-forth in front of the access assembly 26. In another embodiment, the placement of a hand of the user 23 on the access assembly 24 may also effect RSSI.

As described in block 110 above, the scenario data 66 may further include preprogrammed RSSI data indicative of the detected periodic variation in signal strength expected when the device-free gesture is performed. The RSSI module 92 may compare the measured periodic variation in signal strength to the preprogrammed RSSI data to further confirm, or increase a level of confidence, that the device-free gesture occurred.

In another embodiment, the scenario data 66 may only include the preprogrammed RSSI data. In this embodiment, the determination by the application 60 that the device-free gesture was performed may be based solely on the preprogrammed RSSI data. Therefore, the IMU sensor system 46 may not be required.

Mobile Device Disposed in User Carried Containment:

As previously described, the mobile device 26 may be located remotely from the immediate vicinity of the intentional gesture (i.e., device-free gesture 25) being performed. For example, the mobile device 26 may be carried generally against the body of a user 23 (e.g., rear pocket) but not in the hand 74 performing the device-free gesture (see FIG. 1).

Figure 10:
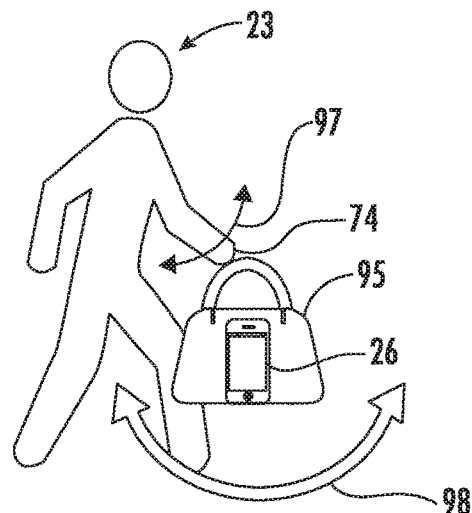
FIG. 10 is a schematic of a user carrying a first type of containment containing the mobile device of the access control system.
Figure 11:
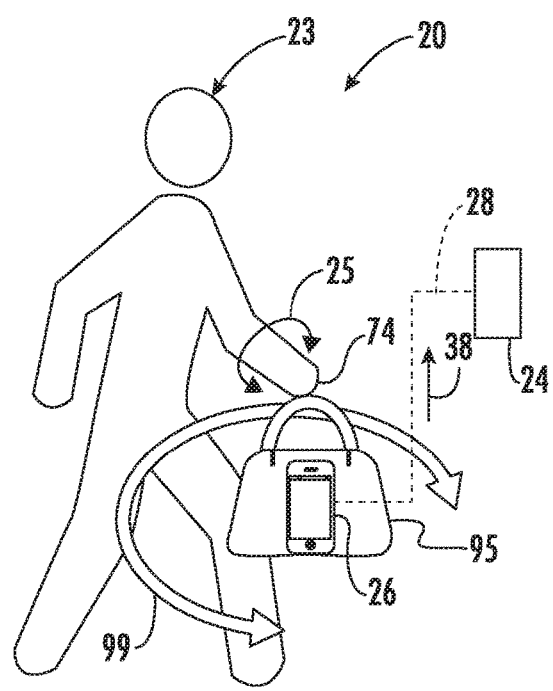
FIG. 11 is a schematic of the access control system relative to FIG. 10 and performing a first device-free gesture.

Referring to FIGS. 10 and 11, a generally device-free gesture 25 may be performed by the user 23, but with the mobile device 26 located in a user-carried containment 95. Non-limiting examples of the containment 95 include a handbag (see FIGS. 10-12), a backpack (see FIGS. 13-15), and other containments adapted to store and/or carry personal items for the user 23 including the mobile device 26.

In one embodiment, the containment 95 is adapted to be carried by a specific body component of the user 23. For example, the handbag is carried by the hand 74 of the user 23 and the backpack is carried by the back, or torso, 96 of the user 23. For high confidence detections of the device-free gesture 25, the containment 95 is carried by the body component performing the device-free gesture 25 (i.e., intentional body gesture). For example, if the containment 95 is a handbag or purse, the hand 74 that grasps the handbag may perform the device-free gesture 25 thus carrying the handbag along with the gesturing hand.

The motion of the mobile device 26 is generally measured as previously described using at least the IMU sensor system 46. In one scenario, the measured motion of the mobile device 26 may be a compound motion dynamically created by the user 23 walking as the user performs the intentional body gesture 25 (i.e., device-free gesture). In this scenario, the act of walking may cause the user 23 to swing the arm and hand 74 (i.e., a routine body motion, see arrow 97 in FIG. 10) in forward and rearward directions. The swinging of the hand 74 carries the handbag 95 with it causing the mobile device to experience an associated routine containment motion (see arrow 98 in FIG. 10).

Referring to FIG. 11 and in a continuation of the containment 95 example of a handbag, the intentional body gesture 25 may be the twisting of a wrist associated with the hand 74 of the user 23 that is grasping the handbag 95. The intentional body gesture 25 creates an associated containment gesture (see arrow 99). In one embodiment, the containment gesture 99 may be an amplification of the intentional body gesture 25. In other embodiments, gesture 99 may be about the same as gesture 25 or may be different but expected.

The measured motion of the mobile device 26 is thus a compound motion that includes the containment gesture 99, which is directly affiliated with the intentional body gesture 25, and the routine containment motion 98 that is affiliated with the routine body motion 97. Therefore, the compound motion is indicative of the routine body motion 97 and the intentional body gesture 25 multiplied by a parameter factor. The parameter factor may represent the type of containment 95 (i.e., backpack or handbag) and the position and location of the mobile device 26 with respect to the user 23 and the containment 95. The parameter factor may be part of the scenario data 66, and the environment detection system 48 may assist in determining the position and location of the mobile device 26 and the type of containment 95.

In one embodiment, the intentional body gesture 25 is such that the associated containment gesture 99 is contrary to the routine containment motion 98. For example, the direction of gesture 99 is traverse, or orthogonal to the direction of motion 98. This will assist in higher levels of confidence through improved motion differentiation by the application 60.

Figure 12:
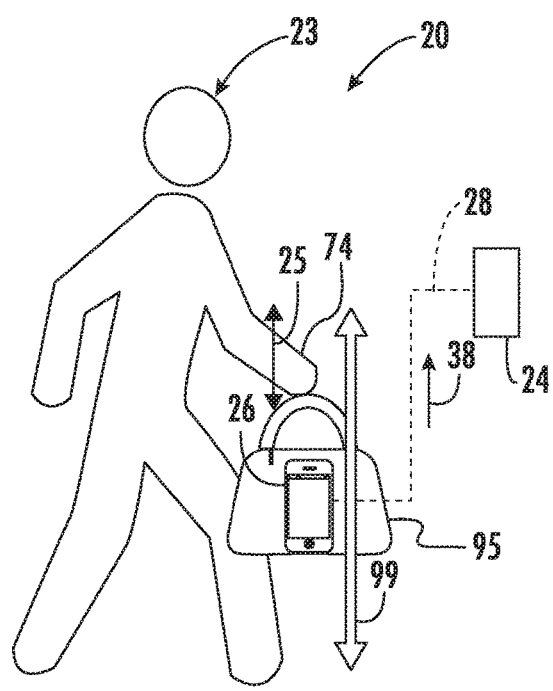
FIG. 12 is a schematic of the access control system relative to FIG. 10 and performing a second device-free gesture.

Referring to FIG. 12, another example of a containment gesture 99 is illustrated wherein a handbag is shaken vertically. In this example, the intentional body gesture may be the repetitious lifting and lowering of the hand 74.

Figure 13:
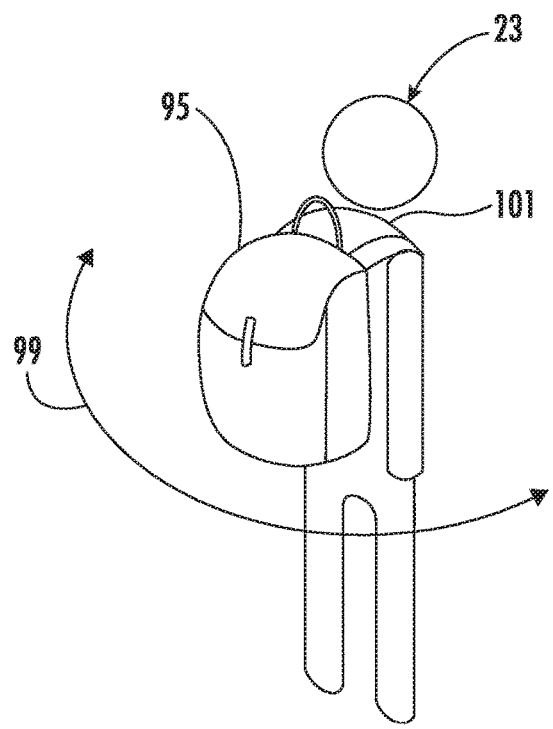
FIG. 13 is a schematic of a user carrying a second type of containment containing the mobile device of the access control system and performing a first containment gesture.
Figure 14:
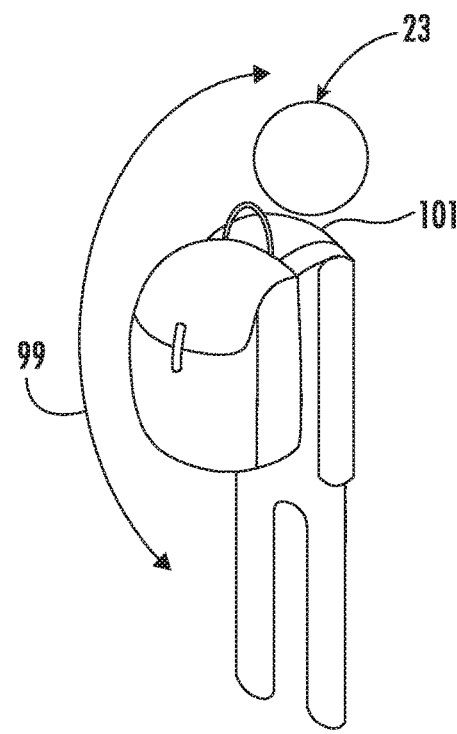
FIG. 14 is a schematic of a user carrying the second type of containment containing the mobile device of the access control system and performing a second containment gesture.
Figure 15:
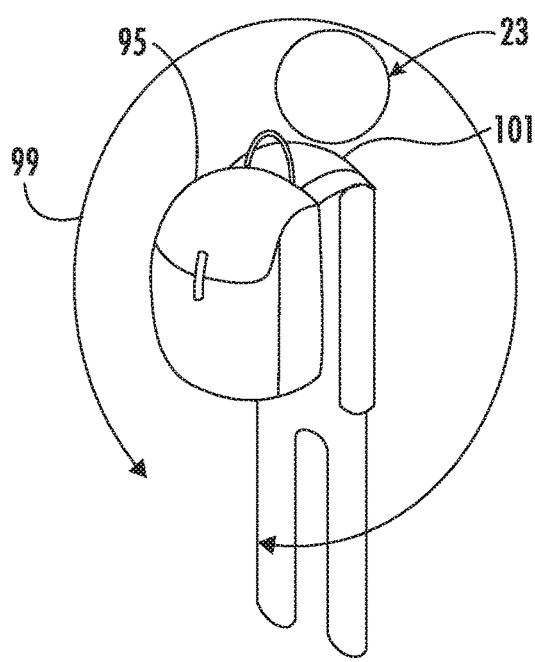
FIG. 15 is a schematic of a user carrying the second type of containment containing the mobile device of the access control system and performing a third containment gesture.

Referring to FIGS. 13-15, another example of a containment 95 is illustrated as a backpack worn on the back, or torso, 101 of the user 23. In FIG. 13 the containment gesture 99 may be caused by a twisting (i.e., the intentional body gesture 25) of the torso 101. In FIG. 14, the containment gesture 99 may be caused by a bending at the waist of the user 23. In FIG. 15, the containment gesture 99 may be caused by a flexing left-to-right of the torso 101 or waist of the user 23.

Detecting Device Gesture:

As previously described, determining the occurrence of a device-free gesture can be accomplished through the analysis of a measured compound motion of the mobile device 26 and other influencing parameters. For example, if the mobile device 26 is in a back pocket 56, and a right hand 74 is performing the device-free gesture, the compound motion undergone by the mobile device 26 is analyzed as an indirect indication of the device-free gesture occurrence.

Figure 5:
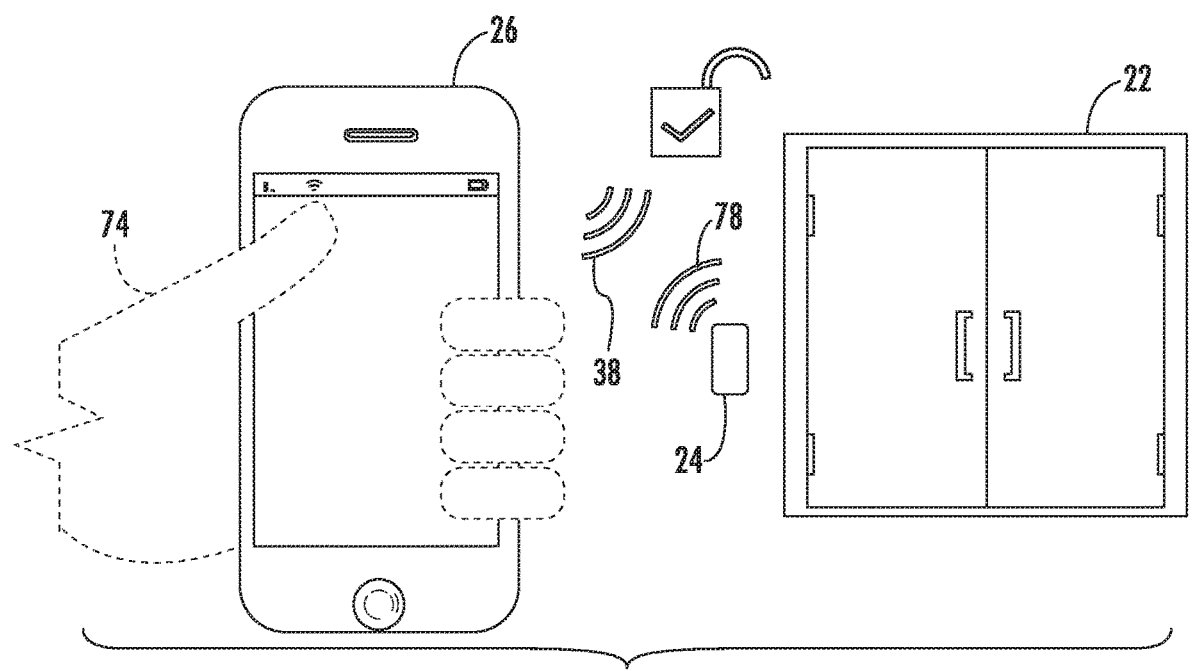
FIG. 5 is a schematic of another embodiment of the access control system applying a device gesture.

Referring to FIGS. 2 and 5, and in another embodiment, the mobile device 26 may be used to perform the gesture (i.e., a device gesture). In this example, the device gesture is generally measured directly as the motion of the mobile device 26. However, it is still appreciated that the motion measured by the mobile device 26 may still be a type of compound motion.

For example, the device gesture (see arrow 94 in FIG. 6) may generally be a generally horizontal waving of the mobile device 26. If the user 23 remains perfectly still, other than performing the device gesture 94, the mobile device 26 can measure the device gesture 94 directly and no motion differentiation of a compound motion is needed. However, if the user 23 is walking while performing the device gesture 94, the walking motion will also be measured with the device gesture 94 thus producing a measured compound motion. That is, the walking motion creates a kind of noise that may interfere with a reliable interpretation of access intent.

The compound motion in this example may be analyzed as previously described with proper scenario data 66 established with the prescribed condition that the intentional gesture is a device gesture 94. Other, non-limiting, examples of device gestures 94 may include waving the mobile device 26 in a substantially vertical direction in front of the access assembly 24 (i.e., an imitated swiping of an imaginary access card, see FIG. 7), repeatedly moving the mobile device 26 toward and away from the access assembly 24 (see FIG. 8), generally twisting the mobile device 26 by about ninety degrees in front of the access assembly (see FIG. 9), and others gestures.

Like the example of a device-free gesture, in the example of the device gesture 94, the access assembly 24 may not perform the motion detection or measurement. All such analysis may remain with the application 60 as part of the mobile device 26. Optionally, the mobile device 26 may include the RSSI module 92 which can measure periodic variation signal strength of a beacon signal 78 as a result of the mobile device 26, repetitiously, moving across the beacon signal path, or wireless interface 28.

Figure 20:
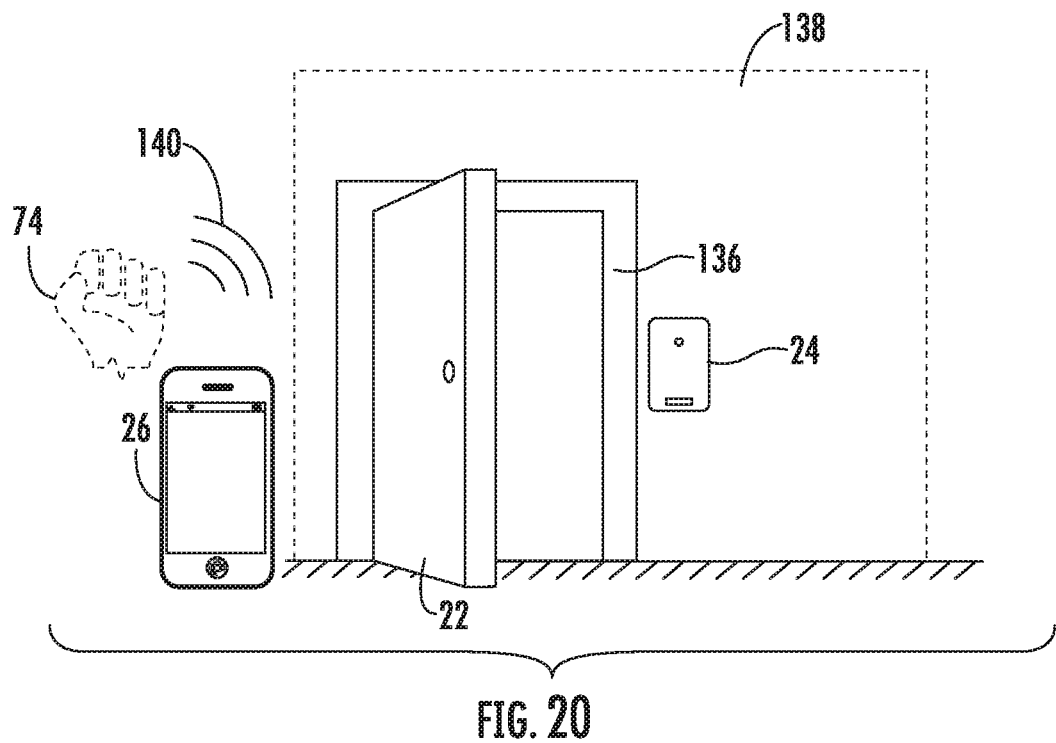
FIG. 20 is a schematic of the application of another embodiment of the gesture-based access control system being a knocking gesture access control system.

Knocking/Tapping Gesture Access Control System:

Referring to FIGS. 2 and 20, the gesture-based access control system 20, in one embodiment, may be a knocking gesture access control system. In this embodiment, the user 23 of the mobile device 26 performs a knock that may be a predefined frequency of knocks. The term "knock" in the present embodiment would include the act of tapping. The knocking may be performed on the mobile device 26, the access assembly 24, the door 22 (see FIG. 1), a wall area proximate to the access assembly 24 and/or door 22, or any other surface conveniently located near the access point.

The mobile device 26 of the knocking gesture access control system 20 may further include a microphone 130, and a knock module 132 of the application 60. The microphone 130 may be sensitive enough to detect a wide range of frequencies and magnitudes (i.e., loudness) to track the sound originated by repetitious knocking on, for example, a surface (e.g., front surface) of the mobile device 26, a surface of the door 22, a surface of the door frame 136, a surface of the access device 24, a surface of a wall 138 through which the door 22 provides access, or other surfaces. The knocking is an intentional gesture performed by the user 23 (see knocking gesture 140 in FIG. 20. Knocking or tapping on the mobile device 26 may be considered to be a device gesture as a type of intentional gesture, and knocking on any other surface may be considered to be a device-free gesture as a type of intentional gesture.

In one embodiment, the knock module 132 of the application 60 is configured to receive the signature of, or information relative to, the audible sound created by the knocking gesture 140. The knock module 132 may then compare a measured frequency pattern of the audible sound (i.e., frequency of knocks or taps) to a preprogrammed frequency pattern. In one embodiment, if the measured frequency pattern sufficiently compares to, or substantially matches, the preprogrammed frequency pattern, the knock module 132 may determine that the knocking gesture 140 was performed by the user 23, and effect the sending of the command signal 38 to the access assembly 24.

In another embodiment, the knocking gesture access control system 20 may be configured to further confirm (e.g., independently confirm) performance of the knocking gesture to enhance reliability and reduce or eliminate false gesture confirmations. One such confirmation may include use of the IMU sensor system 46 similar to that previously described. For example, if the mobile device 26 is in a back pocket 56 (see FIG. 1) and the user 23 performs the knocking gesture 140 upon the door 22, the mobile device 23 may still measure a motion (i.e., of the mobile device) attributable to the act of knocking. In certain scenarios (e.g., user walking), the actual motion measured may be a compound motion, and the application 60 is configured to decipher multiple motions from the compound motion. Once deciphered, the frequency pattern of the motion attributable by the knocking is compared to a preprogrammed motion frequency pattern (i.e., may be the same as the audible frequency pattern), if the motion frequency pattern compares to, or substantially matches, the preprogrammed frequency pattern, the confirmation that the knocking gesture was performed is re-affirmed.

In another embodiment, the knocking gesture access control system 20 may use other sensory data to re-affirm gesture confirmation. For example, light sensor data from the environment detecting system 48 and/or RSSI data produced by fluctuations of the beacon signal 78 and produced by the RSSI module 92 as previously described. In one embodiment, the knocking gesture 140 may be a device-free gesture. In this example and if the IMU sensing system 46 is applied, the location of the mobile device 26 may also be determined in ways previously described. The detection process applied to detect the knocking gesture 140 may fuse the various methods described and optionally, the mobile device location method, to provide good intent markers as part of the application 60.

Figure 21:
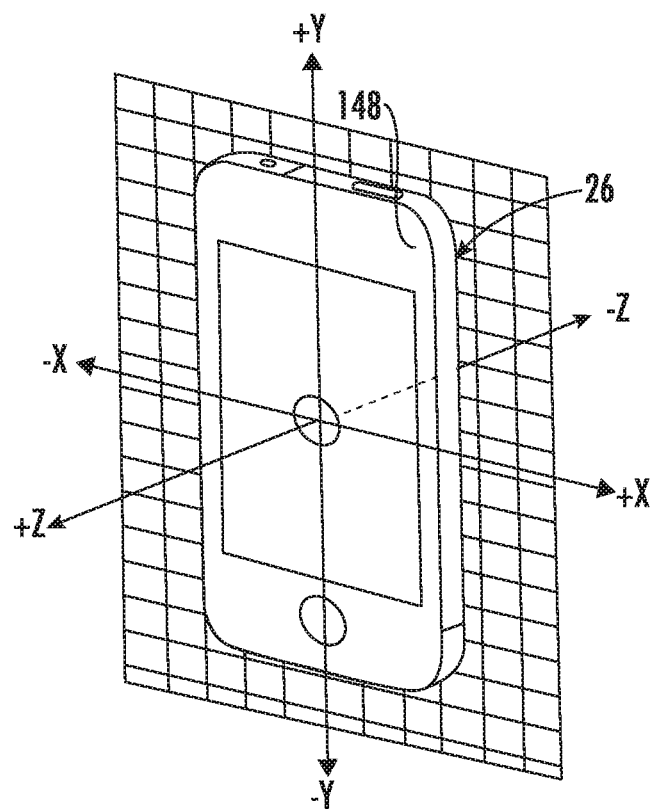
FIG. 21 is a perspective view of the mobile device 26.

Referring to FIGS. 2, 20 and 21, and in another embodiment, the knocking gesture 140 may be performed upon a front surface 148 of the mobile device 26. The mobile device 26 is associated with the X-Y-Z coordinates illustrated in FIG. 21. If the knocking gesture 140 is performed against the surface 148, the audible knocking sound is evaluated as previously described. The re-confirmation of the detection utilizing the IMU sensing system 46 and conducted by the knock module 132, may evaluate the motion along the Z-axis only to mask-off motion noise produced along other coordinates. That is, the knocking is performed against the front surface 148, and the direction of the knocking is substantially normal to the front surface 148.

It is understood and contemplated that the knocking on the mobile device 26 instead of the door 22 may prevent disturbing a person on the other side of the door 22, where access is intended by the user 23. It is further understood, that preconditions may apply before the knocking gesture 140 is accepted. Such a pre-condition may be a requirement that the user 23 is within a pre-defined proximity of the access assembly 24, or door 22. Moreover, the knocking on the mobile device 26 can be done before the uses 23 reaches the door. In contrast, the example of knocking on the door is when the user 23 has already arrived. Therefore, in the example of knocking on the mobile device 26 enables the user 23 to perform an action as the user walks up to the door 22. The door 22 may then be unlocked when the user 23 arrives.

Adaptive Intent Mode Detection

Figure 16:
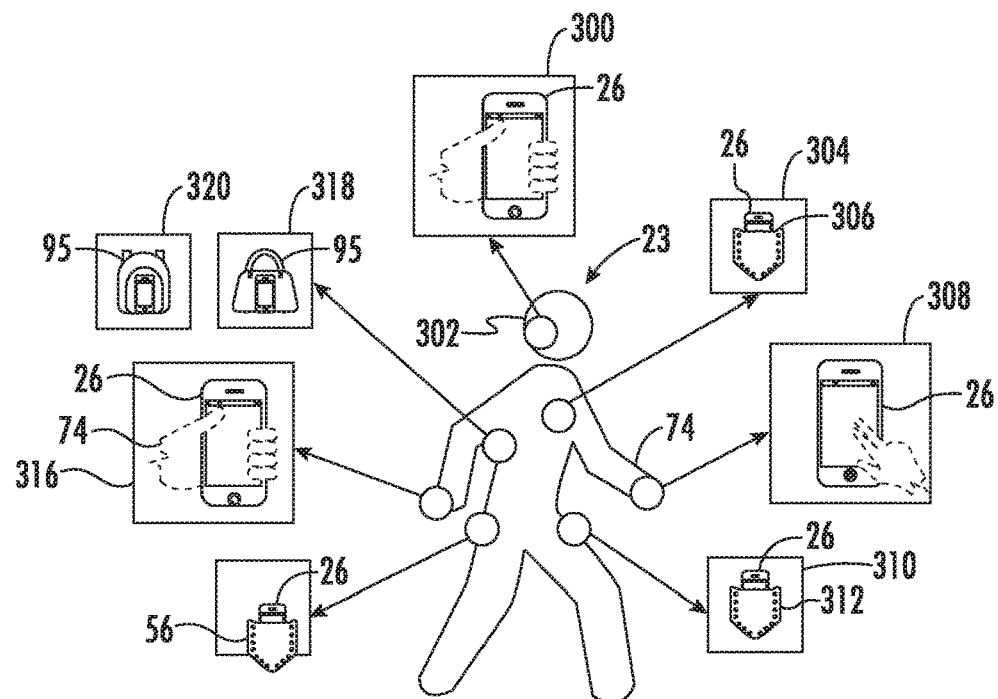
FIG. 16 is a schematic of the user illustrating various positions, locations, and uses of the mobile device 26 relative to an adaptive intent mode detection feature of the gesture-based access control system.
Figure 17:
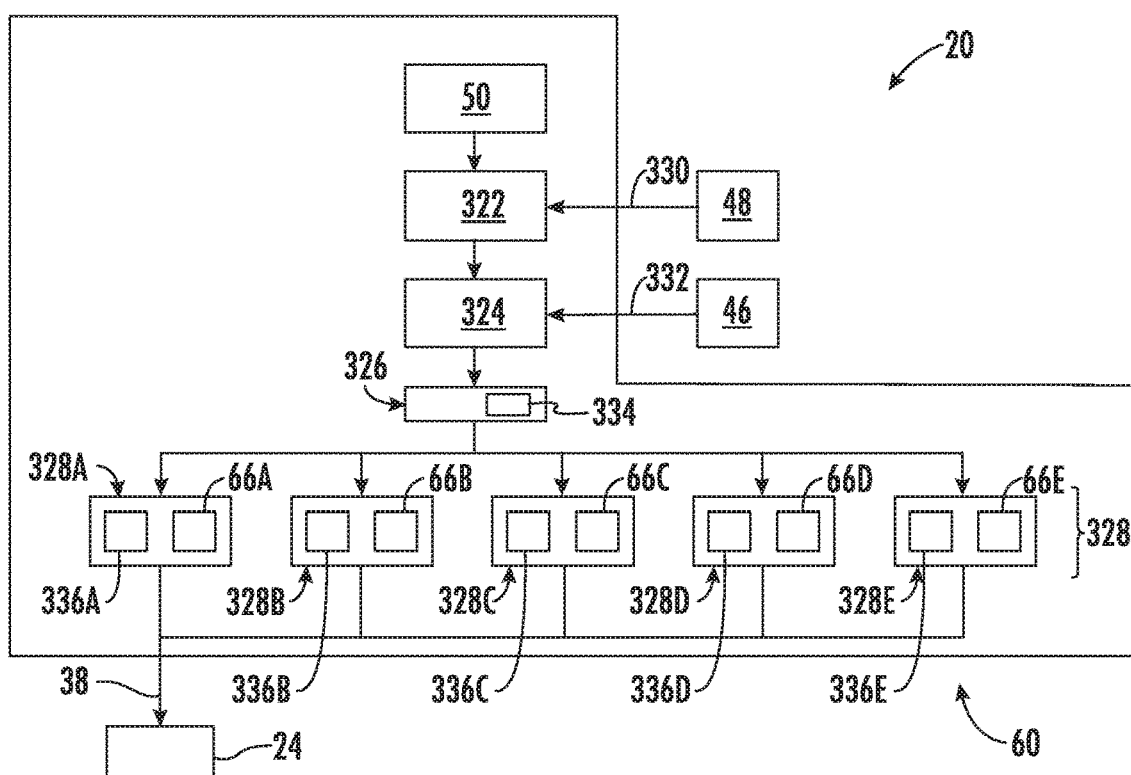
FIG. 17 is a schematic of the gesture-based access control system illustrating the adaptive intent mode detection feature.

Referring to FIGS. 16 and 17, the gesture-based access control system 20 may be flexible and capable of automatically adjusting for different intentional gestures including the device gesture 94 (see FIG. 6) and the device-free gesture 25 (see FIG. 1). In addition, the access control system 20 may adjust for the array of motions (i.e., compound motions), locations, and positions of the mobile device 26 when determining if an intentional gesture 25, 94 is being performed by the user 23.

FIG. 16 illustrates a non-limiting plurality of mobile device 26 locations and uses, wherein the application 60 is capable of adapting to in order to determine if an intentional gesture 25, 94 is being performed. Accordingly, with the determination of mobile device motion, location, position, and/or usage, the application 60 may be further capable of selecting an appropriate preprogrammed gesture from a plurality of preprogrammed gestures.

As previously described, the inertial measurement unit (IMU) sensor system 46, the environment detection system 48, and the internal activity notification module 50, together, are capable of providing information used by the application 60 to determine if an intentional gesture 25, 94 is being performed.

Examples of the potential multitude of mobile device 26 locations, positions, and uses are illustrated in FIG. 16 and may include depiction 300 representative of the mobile device 26 located at an ear 302 of the user 23 with a usage of conversing or calling, and a substantially vertical position. Depiction 304 represents the mobile device 26 being in a front shirt pocket 306 thus having a substantially vertical position and in a relatively dark environment. Depiction 308 is representative of the mobile device 26 in the hand 74 of the user 23, positioned at about thirty degrees for texting, and with a usage of texting. Depiction 310 is representative of the mobile device 26 being in a front pants pocket 312, thus having a substantially vertical position and being in a relatively dark environment. Depiction 314 is representative of the mobile device 26 being located in the rear pants pocket 56 (also see FIG. 1) thus having a substantially vertical position and being in a relatively dark environment. Depiction 316 is representative of the mobile device 26 hanging. For example, the user 23 may simply be carrying the mobile device 26 in the hand 74. Depiction 318 is of the mobile device 26 in a handbag (i.e., containment 95, also see FIG. 10), thus in a dark environment, and depiction 320 is of the mobile device 26 in a backpack (i.e., containment 95, also see FIG. 13).

Referring to FIG. 17, the application 60 of the access control system 20 may include the activity notification module 50, an environment module 322, a motion module 324, a selection module 326, and a plurality of mode modules (i.e., five illustrated as 328A, 328B, 328C, 328D, 328E). The activity notification module 50 is configured to determine and/or categorized current usage of the mobile device 26. Examples of usage include texting, conversing, standby, and others. The environment module 322 is configured to receive and categorize environment information (see arrow 330) from the environment detection system 48. As previously described, environment information 330 may include light level data, temperature data, position data, location data, photographic data, sound data, and other data. The motion module 324 is configured to receive and categorize motion information (see arrow 332) from the IMU sensor system 46. Non-limiting examples of motion information include the compound motion previously describe, and which may occur in a variety of scenarios including when the user 23 is walking, standing still, carrying the containment 95, performing a usage, and a wide variety of other events that may produce motion. One or more of the modules 50, 322, 324 may include algorithms, which may be self-learning algorithms, and preprogrammed data (i.e., portions of the scenario data 66) to refine and/or categorize the information 330, 332, and other data for use by the selection module 326.

The selection module 326 is configured to apply the information outputs from the modules 50, 322, 324 and thereby select one of the mode modules 328. In one embodiment, each of the mode modules 328 may be, at least in-part, associated with a respective depiction 300, 304, 308, 310, 318, 320. The selection module 326 may include a preprogrammed matrix of data 334 and algorithm(s). The preprogrammed matrix of data 334 may be representative of the motion and parameter (i.e., environment and usage) data received from the modules 50, 322, 324. At least from the matrix of data 334, the selection module is capable of selecting the appropriate mode module 328. This selection may occur prior to, or during, the performance of an intentional gesture 25, 94.

Each mode module 328A, 328B, 328C, 328D, 328E may include a respective, preprogrammed, scenario data 66A, 66B, 66C, 66D, 66E of the scenario data 66 previously. Each of the plurality of mode modules 328 may also include a respective one of a suite of intent detection algorithms 336

(i.e., see 336A, 336B, 336C, 336D, 336E) for each respective mode module illustrated. In operation, the selection module 326 is configured to generally activate the appropriate algorithm 336A, 336B, 336C, 336D, 336E by selecting the appropriate module 328A, 328B, 328C, 328D, 328E. Each algorithm 336A, 336B, 336C, 336D, 336E is characterized in accordance with the context where it is applied. For example, algorithm 336A may be suitable when the user 23 has the mobile device 26 in the hand 74, but may be less suitable when the mobile device 26 is in the rear pants pocket 56. Therefore, different mode modules 328 are enabled and disabled in real time by the selection module 326.

In operation, when the appropriate, selected, mode module 328 conditionally detects the intentional gesture 25, 94, the mode module may output the command signal 38 to the access assembly 24.

Figure 18:
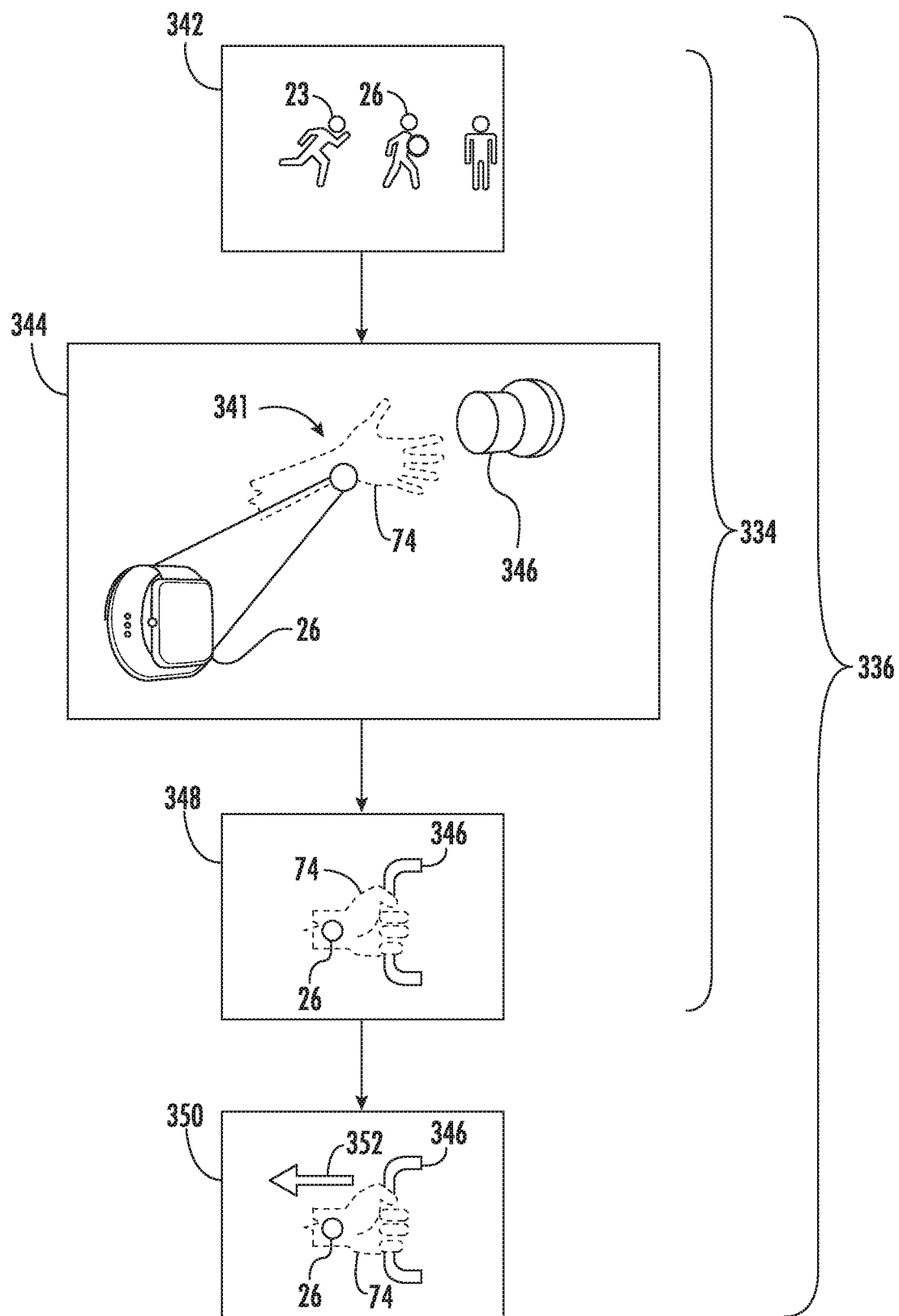
FIG. 18 is a flow chart illustrating a sequential portions of an inherent gesture of a seamless access control system as one embodiment of the gesture-based access control system.

Seamless Access Control System:

Referring to FIGS. 2 and 18, and in one embodiment, the gesture-based access control system 20 may be a seamless access control system adapted to allow access to a user 23 after the user provides an inherent gesture 334 (see FIG. 18) signifying the intentional desire and initial act of, for example, opening the door 22. More specifically, the inherent gesture 334 is the initial part of a typical user exercise 336 conducted to gain entry.

The mobile device 26 for the seamless access control system 20 may be a wearable mobile device. Examples of the wearable mobile device 26 include a smart watch, smart glasses, and smart shoe(s). The term "smart" is meant to indicate that the wearable mobile device 26 includes the processor 56 and other features/components previously described.

The access assembly 26 may further include a near field communication (NFC) device 337 for generating the beacon signal 78. In one example, the NFC device 337 may be a Bluetooth device, the beacon signal 78 is a Bluetooth signal, and the wearable mobile device 26 is configured to process the Bluetooth signal. In one example, the proximity sensor 90 of the environment detection system 48 may be used to measure the strength of the beacon signal 78, and through this measurement, the application may determine the proximity of the wearable mobile device 26 to the access assembly 24.

The mobile device 26 may further include a magnetometer 338 and a confirm ground truth module 340 as part of the application 60 (see FIG. 2). The magnetometer 338 may be leveraged to confirm, for example, the grabbing of a handle 342 of the door 22 as part of the inherent gesture 334. As best illustrated in FIG. 18, the inherent gesture 334 portion of the user exercise 336 may be a sequential set of motions made by the user. The sequential set of motions may be dependent upon the type of wearable mobile device 26 and the type of entry desired.

For simplicity of explanation and understanding that this is only one, nonlimiting, embodiment of an application, the entry type to be gained will be described as entry through a door 22 (see FIG. 1). Also in the present embodiment, the type of mobile device 26 is the smartwatch. In this example, the inherent gesture 334 of the user exercise 336 may begin with, at block 342, a deceleration of walking and/or stopping completely. At block 344, the user 23 may lift the hand 74, carrying the smartwatch 26 with the hand, in order to reach a handle 346 of the door 22. At block 348, the hand 74 may grab the handle 346 preparing to pull or push the door 22 open. This grabbing action of the inherent gesture 334 may be sensed by the magnetometer 338 of the wearable mobile device 26.

In operation, and after the inherent gesture 334 is performed and confirmed by the application 60, the wearable mobile device 26 sends the command signal 38 to the access assembly 24 to effect actuation from the no-access state to the access state, and as previously described. With the access assembly 24 in the access state, and at block 350, the user 23 may complete the entry exercise 336 by pulling (see arrow 352) the door 22 open.

The confirm ground truth module 340 (see FIG. 2) of the application 60 is configured to receive information from the IMU sensing system 46 indicative of the pulling 352 that designates the final step of the entry exercise 336. This confirmed pulling 352 may be verified by a preprogrammed confirmation pull which may be part of the scenario data 66 previously described. By confirming that the user 23 did indeed conduct the pulling 352, the module 340 is able to further confirm an accurate determination of the inherent gesture. This confirmation may then be used to further improve the machine learning algorithm(s) 336 (see FIG. 17) and/or other applied algorithms executed by the application 60.

In the example of the wearable mobile device 26 being smart glasses, the smart glasses may be worn about the head of the user 23, and parts of the inherent gesture 334 may include the user gaze when proximate to the access assembly 24, and tilting of the head when approaching the handle 346 of the door 22.

In the example of the wearable mobile device 26 being smart shoes, the smart shoes may be worn on the feet of the user 23, and part of the inherent gesture 334 may include the tapping of a foot of the user 23.

Figure 22:
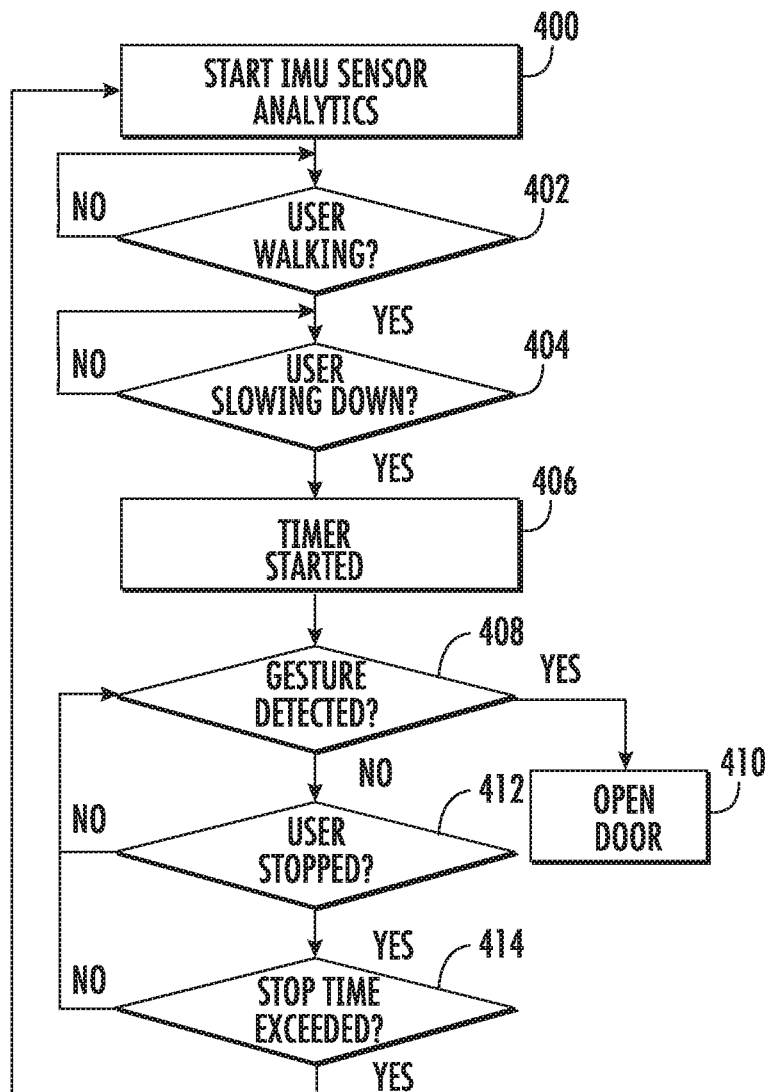
FIG. 22 is a flow chart of a method of operating a prestaging, gesture-based access control system as another embodiment of the gesture-based access control system.

Prestaging, Gesture-Based, Access Control System:

Referring to FIGS. 2 and 22, the gesture-based access control system 20 may be a prestaging, gesture-based access control system. In this embodiment, the mobile device 26 is configured to pre-stage itself prior to the user performing a device, or device-free, gesture (i.e., a primary gesture). That is, the system applies implicit behavior detection in combination with an explicit gesture from a plurality of gestures. The prestaging event, or process, may be, or may include the performance of an inherent gesture 334 (see FIG. 18). After performance of the inherent gesture 334 by the user 23, the user 23 needs to perform the primary gesture within a prescribed duration of time. One, non-limiting, example of the inherent gesture 334 may be the act of slowing down a walk as the user 23 approaches the access assembly 24.

Referring to FIG. 2, the application 60, with any relevant hardware, may further include a timer or clock 142 and a satellite-based location module 144 (e.g., global positioning system (GPS). In another embodiment, the satellite-based location module 144 may be a separate device from the application 60, which is configured to send pertinent location information to the application 60.

In order to detect the prestaging event (i.e. inherent gesture 334), the IMU sensing system 46 may be active. The activation of the IMU sensing system 46 may be triggered when the user 23 is within a prescribed vicinity of the access assembly 24. Establishing a user 23 presence within the vicinity may be established in any one of a variety of ways. For example, any one or more of the following may be used: the satellite-based location module 144, the proximity sensor 90 of the environment detecting system 48, detection of the beacon signal 78 generated from the NFC device 337 of the access assembly 24, and others.

In one, non-limiting, embodiment the implicit detection of an access intent of the user 23 may rely on the intuition that the user will slow down, and stop, as the user approaches a destination door 22 associated with the access assembly 24, and perform a primary, intentional gesture, to indicate the intent. This intuition may be leveraged to improve the reliability of gesture detection.

Referring to FIG. 22, a method of operating the prestaging, gesture-based, access control system 20 is illustrated. At block 400, the IMU sensing system 46 is initiated, wherein the IMU analytics performed by the motion module 324 of the application 60 are started. At block 402, the motion module 324 determines if, for example, the user 23 is walking. At block 404, and if the user 23 is walking, the motion module 324 determines if the user 23 is slowing down the walk (i.e., the inherent gesture 334). If the walking is slowing down, the inherent gesture 334 (in this example) is detected.

At block 406, and after the user 23 is detected, or confirmed, via the inherent gesture 334, the application 60 may start a timer 142 thereby running a prescribed time duration. At block 408, and during the prescribed time duration, the mobile device 26 monitors for the occurrence of a primary, intentional, gesture. If the primary, intentional, gesture is detected and at block 410, the application 60 effects the output of the command signal 38 to the access assembly 24 (e.g., open door 22). It is contemplated and understood that the primary, intentional, gesture may be a device gesture, a device-free gesture, and/or another inherent gesture.

At block 412, as an optional step, and if the primary intentional gesture has yet to be detected, the motion module 324 of the application (or by other means) may determine if the user 23 has, for example, stopped walking altogether. If no, the application 60 continues to monitor for the performance of the primary, intentional, gesture. This optional step may assist when the gesture detection is not at a high confidence level. If the user 23 has stopped walking and at block 414, the application 60 determines if the time duration has expired. If the time duration has not expired, the application 60 continues to monitor for the performance of the primary, intentional, gesture. If the time duration has expired, the process is deactivated, or the motion module 324 is re-initiated for detection of the prestaging, inherent, gesture (i.e., prestaging event performed by the user 23) if the user 23 remains in the vicinity of the access assembly 24.

It is contemplated and understood, that at any stage during the process (e.g., at block 408), the mobile device 26 may provide audible and/or visual notifications to the user 23. For example, the mobile device 26 may notify the user 23 that the mobile device is waiting upon the performance of the primary, intentional, gesture. As another example and upon expiration of the time duration, the mobile device 26 may inform the user 23 that detection of the primary, intentional, gesture has failed.

In one embodiment, the prestaging event may be preprogrammed, and the primary intentional gesture may be preselected from a plurality of preprogramed gestures by the user 23. Non-limiting examples of the primary, intentional, gesture may include: the waving of the hand 74 near the access assembly 24 (i.e., a type of device-free or body gesture 25, see FIG. 1); tapping on the door 22 or the access assembly 24 (a type of device-free or body gesture 25, see FIG. 20); a specific body gesture triggering inertial motion, wherein the mobile device is attached to the body of the user (also see FIG. 1); applying a body motion to a containment 95 containing the mobile device 26 and carried by the user 23 (i.e., a containment motion 99, see FIGS. 12-15); the waving of the mobile device 26 near the access assembly 24 (i.e., a type of device gesture 94, see FIGS. 6-9).

Figure 19:
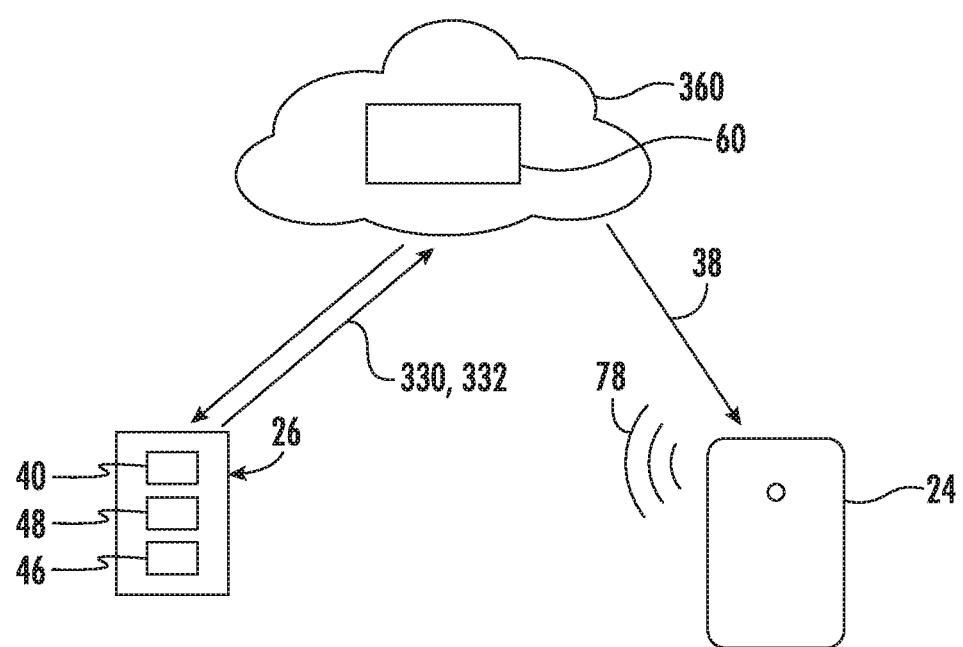
FIG. 19 is a schematic illustrating a cloud-based embodiment of the gesture-based access control system.

Cloud-Based, Gesture-Based, Access Control System:

Referring to FIG. 19, the gesture-based access control system 20 may include use of a cloud 360 (i.e., remote server). In this embodiment, the application 60 may be in the cloud 360, thus information 330, 332 gathered by the IMU sensing system 46, the environment detecting system 48, and other components may be wirelessly sent from the mobile device 26 and to the cloud 360 for processing. The command signal 38 may be sent directly from the cloud 360 and to the access assembly 24, or back to the mobile device 26 that then sends the signal 38 to the access assembly 24.

Benefits of a cloud-based architecture include the performance of some or all computations and the storage of data in the cloud. This permits use of what may be more powerful algorithms, but at the potential expense of delay in communication. Another advantage may be that the mobile device 26 does not need to communicate directly with the access assembly 24, and instead, the cloud 360 communicates a command signal directly to the access assembly 24 for access granting.

Advantages and benefits of the present disclosure include enablement of gesture detection without the need to hold a mobile device 26 in the hand. Another advantage includes the ability to identify, for example, a door 22 that a user 23 intends to enter as part of the intent detection. Yet other advantages include reliable intent detection, and a relatively inexpensive and robust design.

The various functions described above may be implemented or supported by a computer program that is formed from computer readable program codes, and that is embodied in a computer readable medium. Computer readable program codes may include source codes, object codes, executable codes, and others. Computer readable mediums may be any type of media capable of being accessed by a computer, and may include Read Only Memory (ROM), Random Access Memory (RAM), a hard disk drive, a compact disc (CD), a digital video disc (DVD), or other non-transitory forms.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Terms used herein such as component, application, module, system, and the like are intended to refer to a computer-related entity, either hardware, a combination of hardware and software, or software execution. By way of example, an application may be, but is not limited to, a process running on a processor, a processor, an object, an executable, a thread of execution, a program, and/or a computer. An application running on a server and the server, may be a component. One or more applications may reside within a process and/or thread of execution and an application may be localized on one computer and/or distributed between two or more computers.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gesture access system adapted to operate in conjunction with a containment carried by a user, the gesture access system comprising:
    a local access assembly adapted to operate between an access state and a no-access state, the local access assembly including a controller to effect actuation between the access state and the no-access state and a signal receiver;
    a mobile device disposed in the containment and including an inertial measurement unit (IMU) sensor system configured to measure a mobile device motion of the mobile device to conditionally detect an intentional body gesture of the user indicative of an intent of the user of the mobile device to gain access, wherein the intentional body gesture is contrary to routine containment motions caused by routine body motions of the user;
    one or more electronic storage mediums configured to store an application and preprogrammed motion scenario data modeled in association with the intentional body gesture; and
    one or more processors configured to receive the mobile device motion from the IMU sensor system, and execute the application to compare the mobile device motion to the preprogrammed motion scenario data, and thereby conditionally output a command signal to the controller of the local access assembly via the receiver to effect actuation from the no-access state to the access state, wherein the mobile device motion is a compound motion indicative of the routine body motion and the intentional body gesture, wherein the mobile device motion is indicative of a parameter factor associated with a location of the mobile device and a type of the containment, and wherein the mobile device includes an environment detection system configured to send information to the application for determining a location of the mobile device.

2. The gesture access system set forth in claim 1, wherein the containment is a handbag grasped by a hand of the user, the routine containment motion includes swinging forward and rearward, and the intentional body gesture is a horizontal twisting motion of the hand.

3. The gesture access system set forth in claim 1, wherein the containment is a handbag grasped by a hand of the user, the routine containment motion includes swinging forward and rearward, and the intentional body gesture is a repeating vertical motion of the hand resulting in a vertical shaking of the handbag.

4. The gesture access system set forth in claim 1, wherein the containment is a backpack secured to a back of the user, the routine containment motion includes a forward motion indicative of walking in a forward direction, and the intentional body gesture is a twisting motion of a torso of the user.

* * * * *